(12) United States Patent
Kawai

(10) Patent No.: US 12,190,475 B2
(45) Date of Patent: Jan. 7, 2025

(54) INFORMATION PROCESSING APPARATUS, CONTROL METHOD OF INFORMATION PROCESSING APPARATUS, AND STORAGE MEDIUM

(71) Applicant: CANON KABUSHIKI KAISHA, Tokyo (JP)

(72) Inventor: Ryoya Kawai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 657 days.

(21) Appl. No.: 17/374,057

(22) Filed: Jul. 13, 2021

(65) Prior Publication Data

US 2022/0036509 A1    Feb. 3, 2022

(30) Foreign Application Priority Data

Jul. 31, 2020    (JP) .................... 2020-130532

(51) Int. Cl.
| | |
|---|---|
| *G06T 3/60* | (2024.01) |
| *G06F 3/12* | (2006.01) |
| *G06T 3/40* | (2024.01) |
| *G06T 7/70* | (2017.01) |
| *G06T 11/00* | (2006.01) |

(52) U.S. Cl.
CPC .................. *G06T 3/60* (2013.01); *G06F 3/12* (2013.01); *G06T 3/40* (2013.01); *G06T 7/70* (2017.01); *G06T 11/00* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 10,149,526 B2 | 12/2018 | Nagao | |
| 10,757,293 B2 | 8/2020 | Kawai | |
| 2016/0183657 A1 | 6/2016 | Nagao | |
| 2019/0328105 A1* | 10/2019 | Futawatari | ............. A45D 29/00 |
| 2020/0351416 A1 | 11/2020 | Kawai | |
| 2021/0282528 A1* | 9/2021 | Nagao | ................. H04N 1/6097 |

FOREIGN PATENT DOCUMENTS

| | | | |
|---|---|---|---|
| CN | 109349774 A | * | 2/2019 |
| CN | 113442600 A | * | 9/2021 |
| JP | 5375894 B2 | * | 12/2013 |
| JP | 2016-120051 A | | 7/2016 |

* cited by examiner

*Primary Examiner* — Fan Zhang
(74) *Attorney, Agent, or Firm* — Venable LLP

(57) ABSTRACT

An information processing apparatus, which determines a leaning of an object image in a case of inserting the object image into a predetermined area included in a captured image, includes: a detection unit configured to detect the predetermined area from the captured image; a generation unit configured to generate a rectangle that includes the predetermined area detected by the detection unit; and a determination unit configured to determine a leaning of the rectangle relative to a horizontal line or perpendicular line of the captured image as the leaning to be used for inserting the object.

13 Claims, 13 Drawing Sheets

INFORMATION PROCESSING APPARATUS, CONTROL METHOD OF INFORMATION PROCESSING APPARATUS, AND STORAGE MEDIUM

BACKGROUND

Field

The present disclosure relates to a technology for determining a leaning for inserting an object image.

Description of the Related Art

In recent years, it has become possible to print nail art on nails by use of a printer. Hereinafter, the printer that prints nail art on nails will be referred to as a nail printer.

Japanese Patent Laid-Open No. 2016-120051 (hereinafter referred to as Document 1) discloses a technology for printing nail art on a nail by use of a nail printer in a state where the direction of the nail art is aligned with the direction of the nail. Specifically, in Document 1, there is described the technology in which the extending direction of a streak that is present on the front surface of a nail is detected and the direction of the nail art is aligned with the detected extending direction of the streak, so that the direction of the nail art is thereby aligned with the direction of the nail.

However, in the technology described in Document 1, it is not possible to detect the direction of the nail in a state where the streak of the nail cannot be detected.

SUMMARY

An information processing apparatus according to an embodiment of the present disclosure is an information processing apparatus that determines a leaning of an object image in a case of inserting the object image into a predetermined area included in a captured image, the information processing apparatus including: a detection unit configured to detect the predetermined area from the captured image; a generation unit configured to generate a rectangle that includes the predetermined area detected by the detection unit; and a determination unit configured to determine a leaning of the rectangle relative to a horizontal line or perpendicular line of the captured image as the leaning to be used for inserting the object.

Further features of the present disclosure will become apparent from the following description of exemplary embodiments with reference to the attached drawings.

DESCRIPTION OF THE EMBODIMENTS

Hereinafter, embodiments of the present invention will be explained in detail. The following embodiments are examples for explaining the present invention and are not intended to limit the present invention to those embodiments only. Further, the present invention can be modified in various ways as long as the present invention does not deviate from the gist thereof.

First Embodiment

<System Configuration>

The present embodiment is a mode configured with a system including an information processing apparatus and a printer. In the present embodiment, a tablet terminal will be taken as an example of the information processing apparatus for explanation. It is not intended that the information processing apparatus is limited to the tablet terminal. As the information processing apparatus, various apparatuses such as a mobile terminal, a laptop PC, a smartphone, a PDA (Personal Digital Assistant), and a digital camera can be applied. Further, in the present embodiment, for example, an ink jet printer or a 3D printer can be applied as the printer. In addition, the printer of the present embodiment may be a multifunction device having multiple functions such as a copy function, a fax function, and a print function. The printer of the present embodiment has a function of drawing directly on a nail of a human hand. Although the information processing apparatus and the printer will be explained as separate apparatuses in the present embodiment, a mode in which an apparatus integrally including both of the functions is also possible.

Figure 1A:
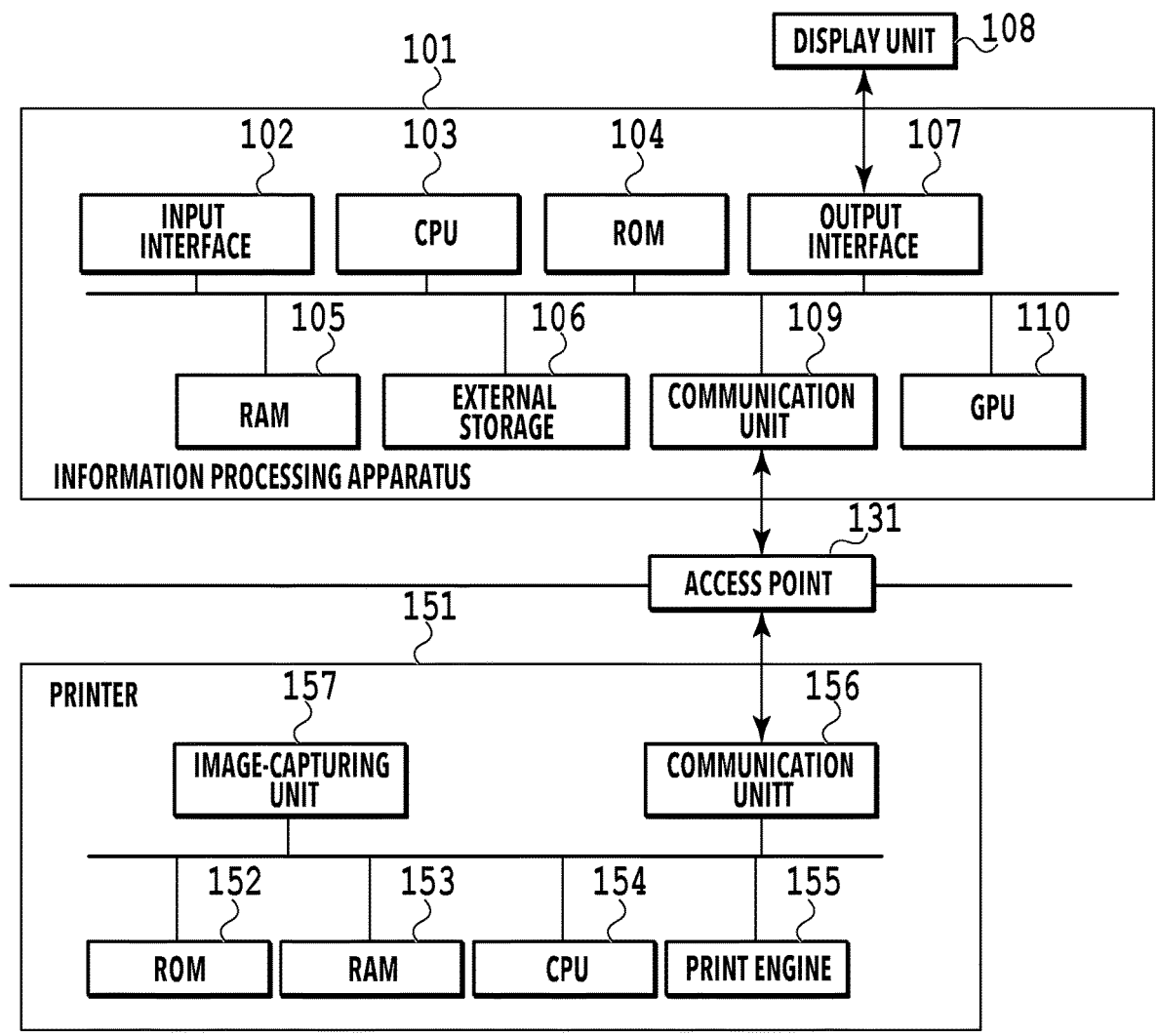
FIG. 1A and FIG. 1B are schematic diagrams illustrating a system configuration.
Figure 1B:
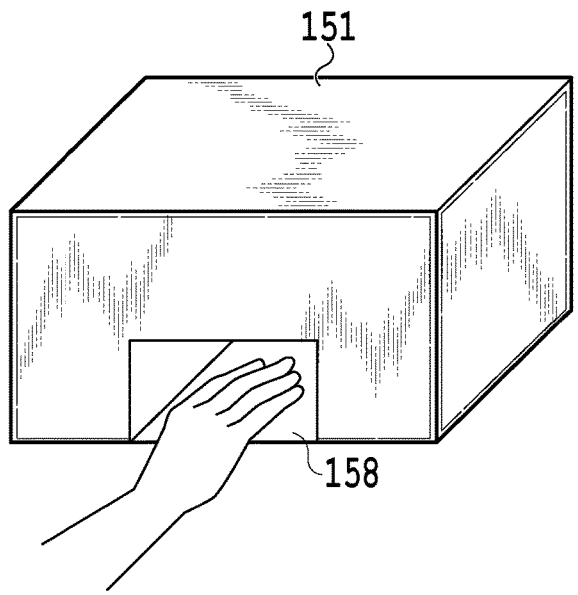

FIG. 1A and FIG. 1B are diagrams for explaining a system including the information processing apparatus 101 and the printer 151 of the present embodiment. A block diagram of the information processing apparatus 101 and the printer 151 is illustrated in FIG. 1A. A schematic diagram of the outer appearance of the printer 151 is illustrated in FIG. 1B. Hereinafter, the configurations of the information processing apparatus 101 and the printer 151 will be explained with reference to FIG. 1A and FIG. 1B.

<Information Processing Apparatus>

As illustrated in FIG. 1A, the information processing apparatus 101 includes the input interface 102, the CPU 103, the ROM 104, the RAM 105, the external storage 106, the output interface 107, the communication unit 109, and the GPU 110. These are connected to each other via a system bus.

The input interface 102 is an interface for accepting data input or operation instructions from the user via an operation unit (not illustrated in FIG. 1A) such as a physical keyboard, buttons, and a touch panel. In the present embodiment, at least a part of the operation unit and the later-described display unit 108 are integrated, and, for example, an output on the screen and reception of an operation from the user are performed on the same screen.

The CPU 103 is a system control unit, which controls the entire information processing apparatus 101, such as executing a program or activating hardware. The ROM 104 stores data such as a control program executed by the CPU 103, a data table, an embedded operating system (hereinafter referred to as an OS), and a program. In the present embodiment, with each control program stored in the ROM 104, software execution controls such as scheduling, task switching, and interruption processing are performed under the control of the embedded OS stored in the ROM 104.

The RAM 105 is configured with a SRAM (Static Random Access Memory), a DRAM (Dynamic Random Access Memory), or the like. Data may be retained in the RAM 105 by a primary battery for data backup, which is not illustrated in FIG. 1A. In that case, the RAM 105 can store data such as program control variables without volatilization. Further, the RAM 105 is equipped also with a memory area for storing setting information of the information processing apparatus 101, management data of the information processing apparatus 101, etc. Further, the RAM 105 is also used as the main memory and a work memory of the CPU 103.

The external storage 106 saves an application for providing a print execution function, a print information generation program for generating print information that can be interpreted by the printer 151, and the like. Further, the external storage 106 saves various kinds of programs, such as an information transmission-reception control program for transmitting and receiving information to and from the printer 151 which is connected via the communication unit 109, and various kinds of information to be used by these programs.

The output interface 107 is an interface for controlling notifications of the state of the information processing apparatus 101, the displaying of data to be performed by the display unit 108, etc.

The display unit 108 is configured with an LED (light emitting diode), an LCD (liquid crystal display device), or the like, and displays data and provides a notification of the state of the information processing apparatus 101, etc. It is also possible to receive an input from the user via the display unit 108 by installing a soft keyboard having keys such as a numeral input key, a mode setting key, a determination key, a cancel key, or a power key on the display unit 108. Further, as described above, the display unit 108 may be configured as a touch panel display device. The display unit 108 is connected to a system bus via the output interface 107.

The communication unit 109 is configured to be connected to an external device, such as the printer 151, to execute data communication. For example, the communication unit 109 can be connected to an access point (not illustrated in FIG. 1A) in the printer 151. That is, in the present embodiment, the communication unit 156 in the printer 151 can operate as an access point. The access point is an example, and the communication unit 156 only needs to operate as a master station for wireless communication conforming to the IEEE802.11 series. For example, operating as a group owner of Wi-Fi (Wireless Fidelity) (registered trademark) Direct is also possible. In a case where the communication unit 109 is connected to an access point in a printer, the information processing apparatus 101 and the printer 151 can thereby perform direct wireless communication with each other. The communication unit 109 may directly communicate with the printer 151 by wireless communication or may communicate via an external access point (access point 131) that is present outside. Further, the wireless communication method is not limited to Wi-Fi (registered trademark) and may be Bluetooth (registered trademark) or the like, for example. Further, examples of the external access point 131 include a device such as a wireless LAN router, etc. In the present embodiment, the method in which the information processing apparatus 101 and the printer 151 are directly connected without the external access point 131 is referred to as a direct connection method. Further, the method in which the information processing apparatus 101 and the printer 151 are connected via the external access point 131 is referred to as an infrastructure connection method. A mode in which the information processing apparatus 101 and the printer 151 are connected by a wire such as a USB cable is also possible.

Since the GPU 110 can perform efficient calculations by processing a larger amount of data in a parallel manner, it is effective to perform the processing on the GPU 110 in a case of processing a learning model such as deep learning. Therefore, in the present embodiment, the GPU 110 is used in addition to the CPU 103 for the processing using a learning model. Specifically, in a case of executing a learning program including a learning model, the CPU 103 and the GPU 110 cooperate to perform calculations for processing the learning model. The processing using the learning model may be performed only by the CPU 103 or the GPU 110.

In the present embodiment, it is assumed that the information processing apparatus 101 stores a predetermined application in the ROM 104, the external storage 106, or the like. The predetermined application is, for example, an application program for sending a print job for printing nail art data to the printer 151 in response to an operation from the user. An application having such a function is hereinafter referred to as a nail app. The nail app may have another function other than the printing function. For example, the nail app in the present embodiment may have a function of communicating with the printer 151 to activate a camera of the image-capturing unit 157 in the printer 151. That is, the nail app may have a function of sending a camera activation job in addition to a print job to the printer 151, etc. Further, the predetermined application stored in the ROM 104, the external storage 106, or the like is not limited to the nail app and may be an application program having a function other than printing.

<Printer>

The printer 151 includes the ROM 152, the RAM 153, the CPU 154, the print engine 155, the communication unit 156, and the image-capturing unit 157. These are connected to each other via a system bus. FIG. 1B is a schematic diagram illustrating the outer appearance of the printer 151. As illustrated in FIG. 1B, the printer 151 is equipped with the printing target insertion unit 158, which is a space for inserting a printing target. In FIG. 1B, a situation in which the user is inserting his or her hand into the printing target insertion unit 158 is illustrated. As described above, in the present embodiment, it is assumed that a human hand is inserted into the printing target insertion unit 158. Further, in the present embodiment, the printing target is a nail. The printing target insertion unit 158 is equipped with four rails on which fingers are placed, so that one to four fingers can be inserted. With elevation of the rails, it is possible to adjust the height of the nails to the optimum height for printing. This elevation operation is executed with an instruction from the nail app. Although the example in which a fingernail is the printing target is shown in the present embodiment, without being limited to a hand, it is also possible that a toenail is the printing target.

The ROM 152 stores data such as a control program executed by the CPU 154, a data table, and an OS program. In the present embodiment, with each control program stored in the ROM 152, software execution controls such as scheduling, task switching, and interruption processing are performed under the control of the embedded OS stored in the ROM 152.

The RAM 153 is configured with a SRAM, DRAM, or the like. Data may be retained in the RAM 153 by a primary battery for data backup, which is not illustrated in FIG. 1A. In this case, the RAM 153 can store data such as program control variables without volatilization. Further, the RAM 153 is equipped also with a memory area for storing setting information of the printer 151, management data of the printer 151, etc. Further, the RAM 153 is also used as the main memory and a work memory of the CPU 154 and can temporarily store the print information, various kinds of information, or the like received from the information processing apparatus 101.

The CPU 154 is a system control unit, which controls the entire printer 151 by executing a program or activating hardware. Based on the information saved in the RAM 153 or a print job received from the information processing apparatus 101, the print engine 155 forms an image on a printing target such as a nail inserted into the printing target insertion unit 158 by use of a recording agent such as ink.

The communication unit 156 can operate as an access point for performing wireless communication with an external device such as the information processing apparatus 101 by a direct connection method. In the present embodiment, this communication unit 156 operating as the access point can be connected to the communication unit 109 of the information processing apparatus 101. The communication unit 156 may directly communicate with the information processing apparatus 101 by wireless communication or may communicate via the external access point 131. In a case where the communication unit 156 is connected to the external access point 131 by the infrastructure connection method, the communication unit 156 operates as a slave station and the external access point 131 operates as a master station. Further, the communication unit 156 may include hardware that functions as an access point or may operate as an access point by software that causes the communication unit 156 to function as an access point.

The image-capturing unit 157 is a device having an image-capturing function. The device having the image-capturing function is attached to and installed in the printer 151. The image-capturing unit 157 has a function of capturing a predetermined area including a printing target (nail) that is inserted into the printing target insertion unit 158 and sending the captured image (still image or moving image) to the information processing apparatus 101 on a real-time basis. In the present embodiment, the image-capturing unit 157 captures a moving image and a still image. The device having the image-capturing function is a camera module configured with at least a lens and an image sensor. The lens captures the printing target that is inserted into the printing target insertion unit 158 to form an image on the image sensor. The image sensor converts the light captured by the lens into electrical signals that can be processed by the CPU 154. If having such a function as described above, a smartphone, a mobile terminal, a digital camera, or the like may be used as a substitute for the device having the image-capturing function. The print engine 155 performs printing on the printing target that is inserted into the printing target insertion unit 158.

It is also possible that a memory such as an external HDD or SD card is mounted on the printer 151 and that the information saved in the printer 151 is saved in the memory. Further, the configuration illustrated in FIG. 1A and FIG. 1B is merely an example, and the information processing apparatus 101 and the printer 151 may include configurations other than the above, but the explanation thereof will be omitted here.

Definition of Terms

Next, the terms used in the present embodiment will be explained. The present embodiment is a mode for mainly printing nail art on nails. Further, the present embodiment is a mode in which nail art is applied (printed) to each nail of one hand. In general, the nail art applied to each nail has the same concept, but there is a case in which the nail art applied to each nail is not exactly the same nail art. For example, the nail art set of design A includes 10 kinds of nail art (nail art corresponding respectively to 10 nails), and the 10 kinds of nail art have a design concept that is common to each other but may not have exactly the same pattern, etc. Based on the above points, the terms will be used as follows in the present embodiment.

"Nail image data" is image data of nail art that is applied to one nail.

"Nail art data" is image data of an aggregation of multiple nail image data. That is, it is also said that the nail art data is a data set of multiple nail image data. Typically, the nail art data is image data in which the images of respective nail image data corresponding to the nail art for a total of 10 nails of a right hand and a left hand are aggregated. The nail art data may be data in which 10 respective nail image data are aggregated (that is, a set of 10 image data) or image data obtained by combining 10 respective nail image data into one image. It is also possible that the nail art data is a data set of respective nail image data corresponding to the nail art for the five nails of one hand.

As described above, in the present embodiment, it is assumed that "nail image data" refers to data of a nail art image for an individual nail, and nail art data refers to data of a set of 10 (or 5) nail art images. Further, the image corresponding to nail image data is also referred to as a nail image or an object image.

<Outline of Printing Nail Art>

In the present embodiment, the CPU 103 of the information processing apparatus 101 activates the nail app by executing the program of the nail app, which is stored in the ROM 104 or the external storage 106. Then, by using the nail app, the user can reflect the nail image data of the nail art data selected by him- or herself in a printable area, in order to print the nail art on a nail. That is, the operation of the following example is performed by use of the nail app. (1) The user selects a set of nail image data (that is, nail art data) on the application. (2) The application activates a camera inside a nail printer. (3) The application displays a camera image that is sent from the nail printer. (4) The user inserts a hand into the nail printer. (5) The application detects a nail area from the camera image and sets the printable area for printing the nail art. (6) The application reflects nail image data included in the nail art data in the set printable area. For example, the application displays the nail image data in the printable area in an overlapping manner. (7) The application edits the printable area in a case where the set printable area is adjusted by the user. (8) The application causes the nail printer to perform printing by use of the reflected nail image data.

In the above-described processes (5) and (6) of the present embodiment, the leaning direction of the nail (the leaning direction relative to the horizontal line or the perpendicular line of the camera image) is detected from the detected nail area. Further, an explanation will be given of the mode in which the inserting direction (rotation direction) of the nail art data is aligned with the leaning direction of the nail for the reflection. That is, an explanation will be given of the example in which, in a case where an object (nail image) is reflected in a predetermined area (nail area) included in a captured image, the leaning (rotational angle) for reflecting the object is appropriately determined for the reflection of the object. The user who inserts his or her hand into the printer 151 and the user who operates the application may be the same user or different users.

Further, in a case of utilizing a nail printer, a gel-like liquid is applied to the user's nails in advance in order to print nail art more vividly. Hereinafter, this liquid is referred to as a base coat. In a case of printing nail art on nails, it is common that the base coat has already been applied to the nails. In the present embodiment, it is assumed that the base coat is applied to the user's nails at the point in time of (4) which is described above.

<User Interface of the Nail App>

Figure 2:
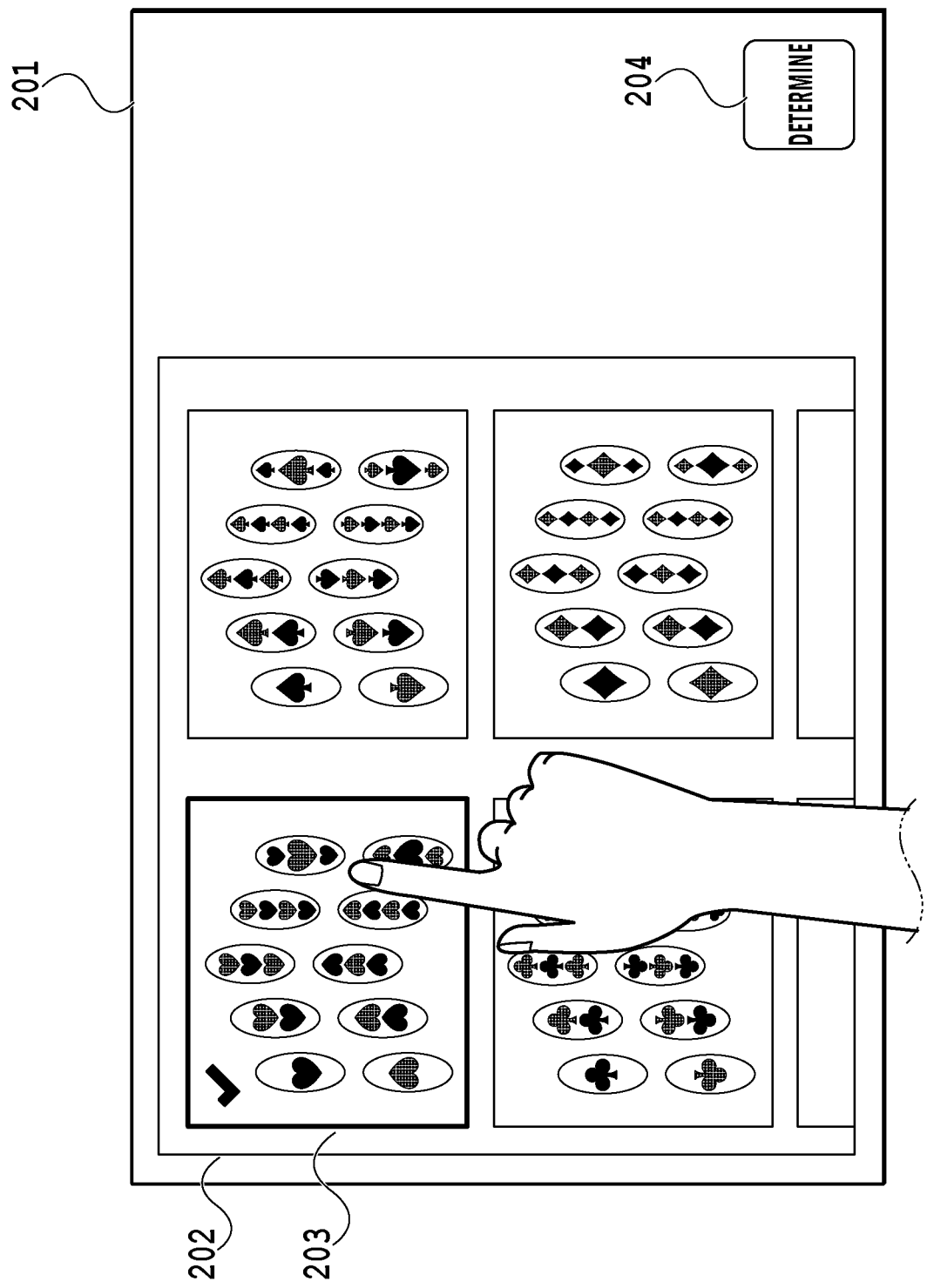
FIG. 2 is a diagram for explaining a UI screen illustrating a nail art selection screen.
Figure 3:
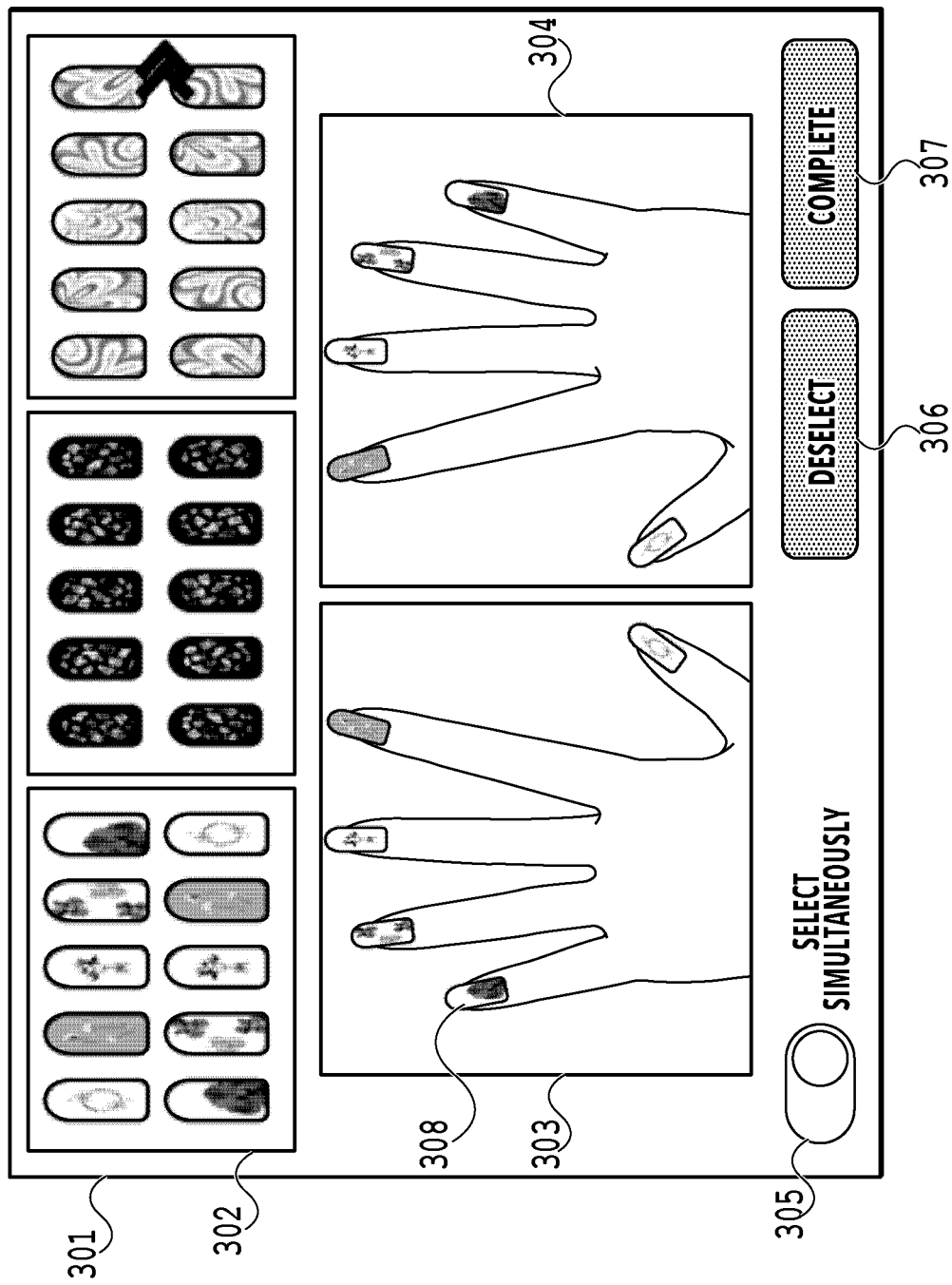
FIG. 3 is a diagram for explaining a UI screen illustrating a nail image data setting screen.
Figure 4:
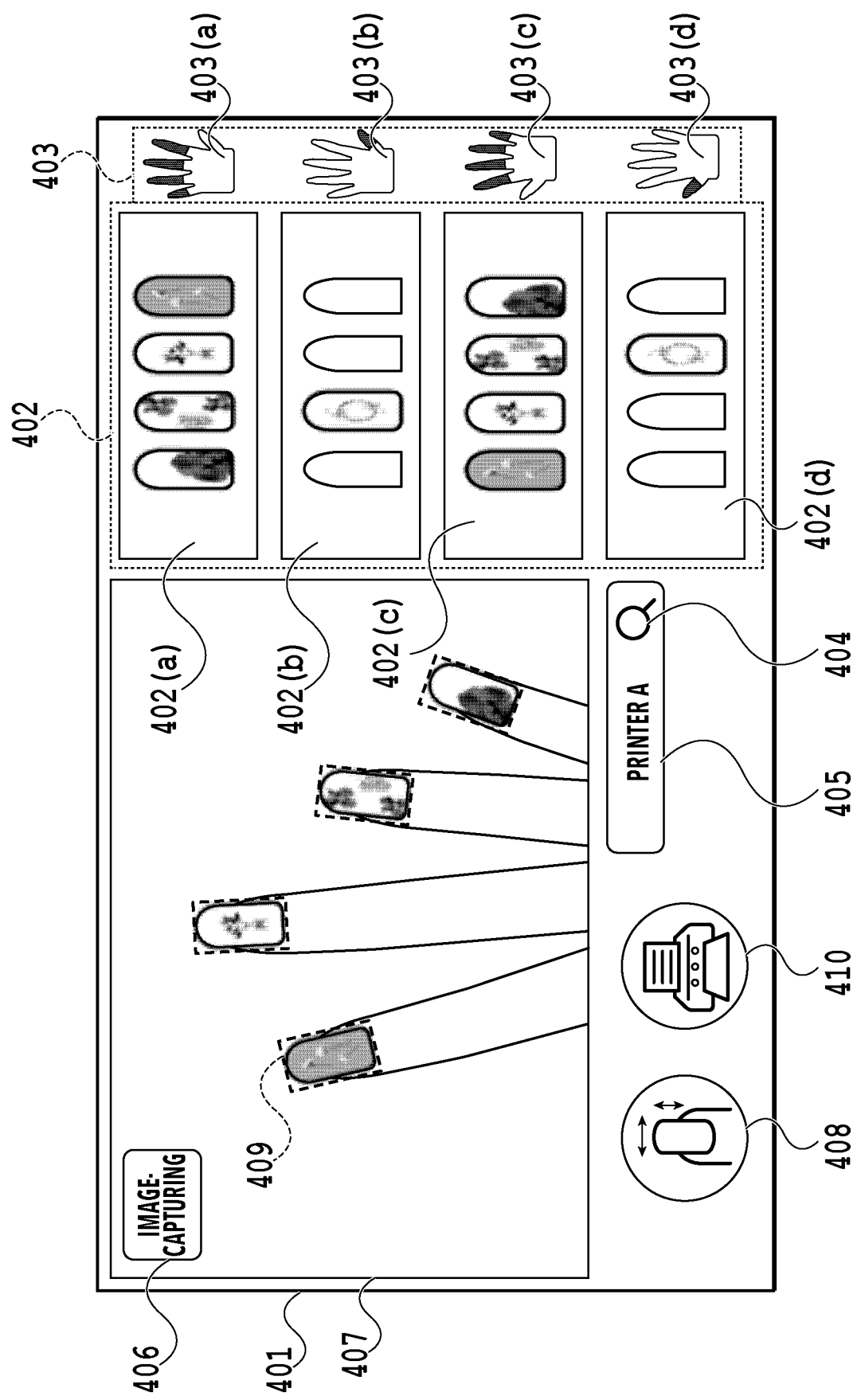
FIG. 4 is a diagram for explaining a UI screen illustrating a print data generation screen.

For ease of understanding, the user interface (hereinafter referred to as UI) screens displayed by the nail app will be explained first. The UI screens explained below are displayed on the display unit 108 by the CPU 103 that executes the nail app. Further, the explanation will be given on an assumption that the input interface 102 functions as an operation unit integrated with the display unit 108. There are roughly three types of UI screens for the nail app in the present embodiment. The first UI screen is the nail art data selection screen, which is illustrated in FIG. 2. The second UI screen is the nail image data setting screen, which is illustrated in FIG. 3. The third UI screen is the print data generation screen, which is illustrated in FIG. 4. Hereinafter, the UI screens of the nail app will be explained with reference to the respective screens.

FIG. 2 is a diagram for explaining a UI screen (first UI screen) illustrating the nail art data selection screen 201. The nail art data selection screen 201 illustrated in FIG. 2 includes the nail art data display area 202 and the nail art data determination button 204.

In the nail art data display area 202, multiple nail art data corresponding to respective design concepts of nail art to be printed on respective nails are displayed. Specifically, four sets of nail art data 203 are displayed on the screen of FIG. 2. One nail art data 203 includes 10 types of nail image data corresponding to the nails of the left and right hands, that is, the thumbs, index fingers, middle fingers, ring fingers, and little fingers, respectively. The user can select one or more nail art data 203. The user can also deselect the selected nail art data 203. As an example of the method in which the user selects or deselects the nail art data 203, the user can select the nail art data 203 by tapping the nail art data 203 once. Further, if the user taps the selected nail art data 203 one more time, the selected state can be deselected.

The nail art data determination button 204 has a function of transitioning to the nail image data setting screen 301 illustrated in FIG. 3 in a case of being pressed after the user selects one or more nail art data 203 from the nail art data display area 202.

In the present embodiment, an operation on various buttons is referred to as "pressing", and an operation on each area is assumed to be an operation on a touch panel and thus the explanation thereof is given with "tap", "touch", "pinch in", "pinch out", etc., although these are merely examples. For example, the pressing operation on various buttons may be implemented by touching various buttons on the touch panel. Further, the operation on each area may be performed by, for example, a cursor operation using a mouse, etc. Further, it is also possible that the input interface 102 includes various direction instruction buttons and thus the operation on each area may be performed by the direction instruction buttons.

FIG. 3 is a diagram for explaining a UI screen (second UI screen) illustrating the nail image data setting screen 301. The nail image data setting screen 301 illustrated in FIG. 3 includes the nail art data display area 302, the left-hand preview area 303, the right-hand preview area 304, the selection mode switching button 305, the deselection button 306, and the setting completion button 307.

The nail art data display area 302 is an area for displaying the nail art data selected by the user on the nail art data selection screen 201.

The left-hand preview area 303 and the right-hand preview area 304 each hold a total of five nail setting areas 308 from the thumb to the little finger. By selecting nail art data or nail image data from the nail art data display area 302, the user can set the nail image data in the nail setting areas 308 of the left-hand preview area 303 and the right-hand preview area 304. Although it is assumed that the preview images of the hands in FIG. 3 are images that are prepared in advance and the nail setting areas 308 are also areas that are set in advance, there is not such a limitation. It is also possible to use a captured image of the user's hand inserted into the printing target insertion unit 158 of the printer 151, and, in this case, the nail setting area 308 may be a nail area that is detected in the captured image.

The selection mode switching button 305 is a button for switching the method of selecting nail art data or nail image data to be set in the nail setting areas 308 held in the left-hand preview area 303 and the right-hand preview area 304. In a case where the simultaneous selection mode is ON, the nail art data selected by the user from the nail art data display area 302 can be simultaneously reflected in the nail setting areas 308 held in the left-hand preview area 303 and the right-hand preview area 304. In a case where the simultaneous selection mode is OFF, the nail image data selected by the user from the nail art data display area 302 can be set in either of the nail setting areas 308 held in the left-hand preview area 303 and the right-hand preview area 304.

The deselection button 306 is a button that can be selected in a case where at least one nail image data has already been set in the nail setting areas 308 held in the left-hand preview area 303 and the right-hand preview area 304. In a case where the deselection button 306 is pressed, all the set nail image data is deselected.

The setting completion button 307 is a button that can be selected in a case where at least one nail image data has been set by the user in the nail setting areas 308 held in the left-hand preview area 303 and the right-hand preview area 304. In a case where the setting completion button 307 is pressed, the transition to the print data generation screen 401 illustrated in FIG. 4 is performed.

FIG. 4 is a diagram for explaining a UI screen (third UI screen) illustrating the print data generation screen 401. The print data generation screen 401 illustrated in FIG. 4 includes the setting data display area 402, the printing target display area 403, the printer search button 404, and the printer name display area 405. Further, the image-capturing button 406, the preview area 407, the printable area setting button 408, and the print button 410 are included. The preview area 407 includes the later-described printable area 409.

The setting data display area 402 is an area in which the nail image data that is set on the nail image data setting screen 301 illustrated in FIG. 3 is divided into a maximum of four, such as the data of the left hand data and the data of the right hand, and displayed. In the present example, as the dividing method of the setting data, the combination consisting of the index finger, middle finger, ring finger, and little finger of the left hand as one set, the thumb of the left hand as one set, the index finger, middle finger, ring finger, and little finger of the right hand as one set, and the thumb of the right hand as one set is displayed. In the setting data display area 402 of FIG. 4, a display in a case where nail image data is set for all the nails of the left hand and the right hand is illustrated. That is, in the setting data display area 402 (*a*), the set nail image data of the index finger, middle finger, ring finger, and little finger of the left hand is illustrated. In the setting data display area 402 (*b*), the set nail image data of the thumb of the left hand is illustrated. Similarly, the set nail image data of the index finger, middle finger, ring finger, and little finger of the right hand is illustrated in the setting data display area 402 (*c*), and the set nail image data of the thumb of the right hand is illustrated in the setting data display area 402 (*d*), respectively. One setting data display area is provided with four slots for inserting nail image data. Each of the nail image data that is set in each of the setting data display areas is also collectively referred to as setting data.

The printing target display area 403 is a group of a maximum of four icons indicating the setting data display areas 402 (*a*) to (*d*) corresponding to the setting data display areas for the respective nails. As with the setting data display areas 402, the printing target display area 403 is displayed with the combination consisting of the index finger, middle finger, ring finger, and little finger of the left hand as one set, the thumb of the left hand as one set, the index finger, middle finger, ring finger, and little finger of the right hand as one set, and the thumb of the right hand as one set. In the printing target display area 403 of FIG. 4, a display in a case where nail image data is set for all the nails of the left hand and the right hand is illustrated. That is, in the printing target display area 403 (*a*), the index finger, middle finger, ring finger, and little finger of the left hand are displayed as the printing targets. Similarly, as the printing targets, the thumb of the left hand is illustrated in the printing target display area 403 (*b*), the index finger, middle finger, ring finger, and little finger of the right hand are illustrated in the printing target display area 403 (*c*), and the thumb of the right hand is illustrated in the printing target display area 403 (*d*), respectively.

The printer search button 404 is a button to be pressed by the user for thereby executing the function of searching for the printer 151 capable of communicating with the nail app. In a case where the printer 151 is found as a result of the search, the nail app displays information for specifying the found printer 151. The information for specifying the found printer 151 is displayed in a list, so that the user can select one given printer 151 from the list, and the name of the selected printer 151 is displayed in the printer name display area 405. It is also possible that the list of printers is displayed even in a case other than that where the printer search button 404 is pressed. For example, in a case of transitioning to the print data generation screen 401 in a state without registration of the printer 151, the nail app can automatically search for the printer 151 and display a list of printers.

The image-capturing button 406 is a button to be pressed by the user for thereby communicating with the printer 151 displayed in the printer name display area 405, in order to receive a moving image captured by the image-capturing unit 157 of the printer 151 on a real-time basis and display the moving image in the preview area 407. In the present embodiment, it is assumed that a human hand is inserted into the printing target insertion unit 158. Therefore, for example, if the user inserts one hand and presses the image-capturing button 406 with the other hand, the image of the user's hand including nails is displayed in the preview area 407 on a real-time basis. It is also possible that the moving image is displayed in the preview area 407 not only in a case where the image-capturing button 406 is pressed but also in a case of transitioning to the print data generation screen 401 in a state where the printer 151 has already been registered. In this case, the nail app communicates with the printer 151 at the time of transitioning to the print data generation screen 401 and, in a case of being able to communicate with the printer 151, the nail app can receive the moving image captured by the image-capturing unit 157 of the printer 151. This usage is an example, and, for example, it is also possible that a nail salon customer inserts one hand and a nail salon employee presses the image-capturing button 406 on the UI screen 301.

The printable area setting button 408 is a button to be pressed by the user in a case where a moving image is displayed on the preview area 407, so that transition to the area setting mode for setting the printable area 409 is thereby performed.

Figure 5:
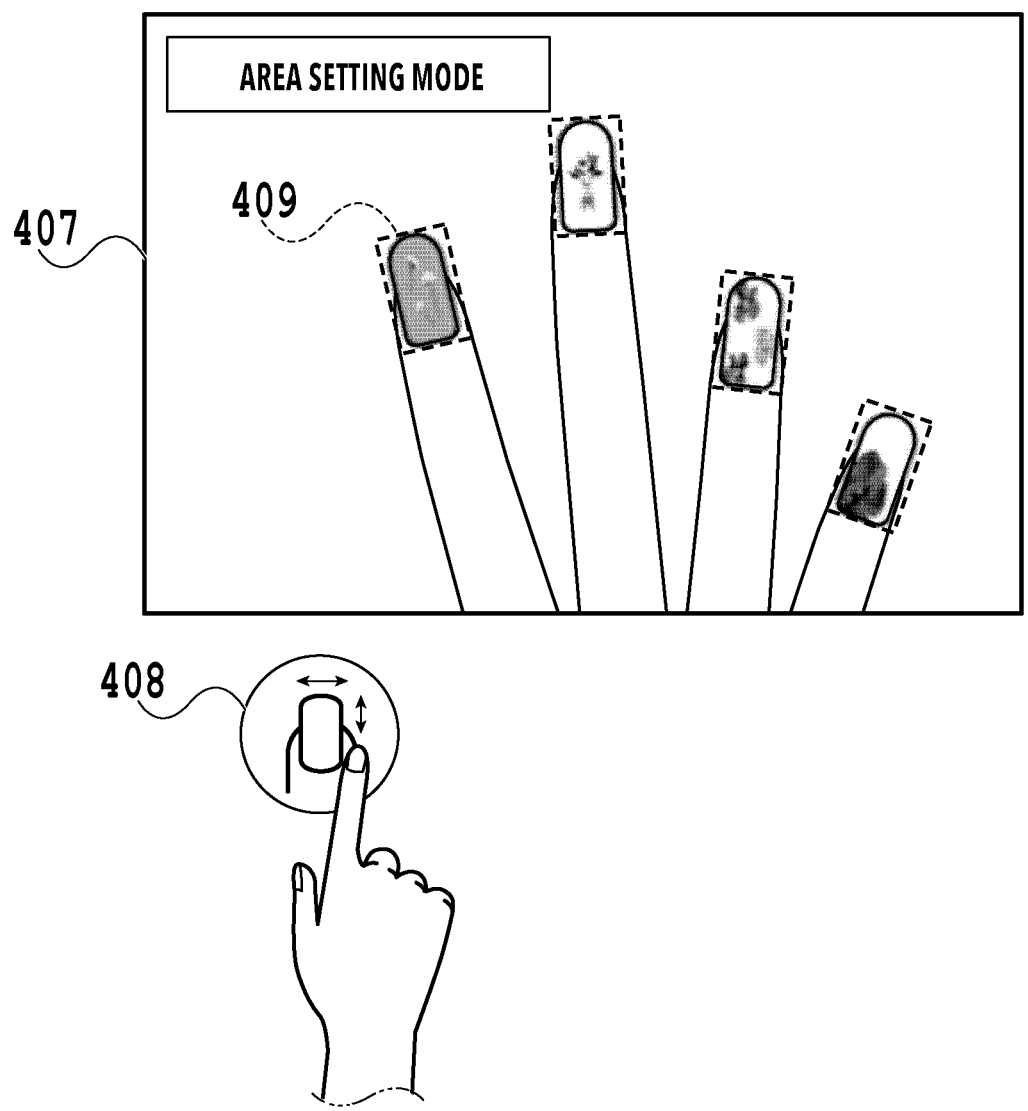
FIG. 5 is a diagram for explaining an example of setting a printable area.

FIG. 5 is a diagram for explaining the example in which, in response to the pressing of the printable area setting button 408, the nail app transitions to the area setting mode in which the printable area 409 can be set, so as to automatically detect a nail area from a moving image or still image and set the printable area 409. The printable area 409 is a rectangular area (indicated by a dotted line) to be a target area in which nail image data is reflected. Nail image data is image data of a rectangle that includes an object, which is a nail. The part other than a nail may have a predetermined background color (for example, white) or may be transparent data. FIG. 5 is a diagram illustrating a result in which the printable areas 409 for four fingers have already been set and the respective nail image data are reflected in these printable areas 409. With reference to FIG. 5, an example of the method for automatically detecting a nail area in the present embodiment will be explained.

Specifically, first, the user presses the printable area setting button 408 to turn the preview area 407 into the area setting mode. Then, the nail app obtains a still image of a user's hand including a nail from the image-capturing unit 157 and automatically detects the nail area from the still image. Then, the printable area 409 is set. The automatically detected area of the nail is referred to as the nail area. The printable area 409 is a rectangular area that at least includes a nail area. As an example of the method for automatically detecting a nail area, for example, pixels having a predetermined color value can be detected as a nail area in a captured still image. Further, it is also possible to perform an edge detection process on the captured still image and use the information obtained as a result thereof. Alternatively, it is also possible to use a learning model generated by machine learning to determine a nail area. The learning model used here is a learning model that outputs a nail area corresponding to an input still image if a still image including a nail is input. The nail app automatically sets the rectangular area including the detected nail area as the printable area 409.

After setting the printable area 409, the nail app automatically inserts (reflects) the nail image data selected by the user from the setting data display area 402 into the printable area 409. Here, the printable area 409 is set in accordance with the leaning direction of the nail, which is defined according to the nail area. Therefore, there is a case in which the printable area 409 is leaning in the preview area 407. In this case, if nail image data of the setting data display area 402 is reflected in the printable area 409, the leaning direction of the nail image data needs to be aligned with the leaning direction of the printable area 409. That is, nail image data needs to be reflected in the printable area 409 after being rotated in accordance with the leaning direction of the printable area 409. In the present embodiment, the process of aligning the leaning direction of the nail image data with the leaning direction of the printable area 409 is performed by use of the method illustrated in FIG. 6.

Figure 6:
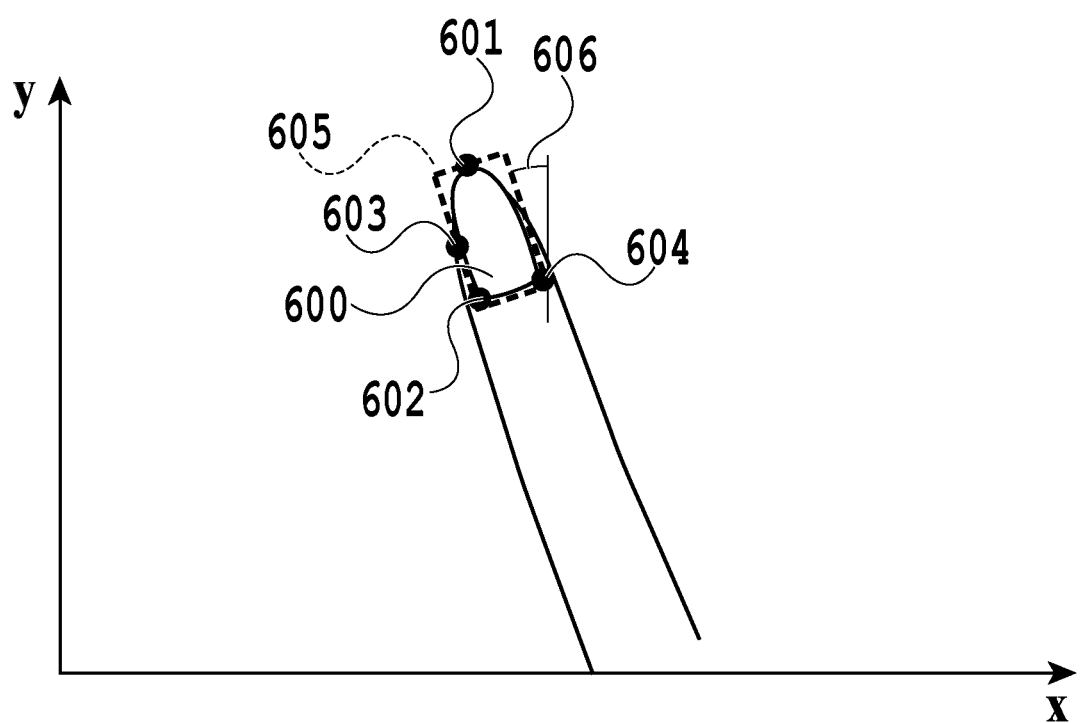
FIG. 6 is a diagram for explaining an example of aligning the direction of nail image data with the direction of the printable area.

FIG. 6 is a diagram for explaining an example in which the leaning direction of nail image data is aligned with the leaning direction of the printable area 409 in the present embodiment. As described above, the printable area 409 (not illustrated in FIG. 6) includes the detected nail area 600. Therefore, in the present embodiment, the leaning direction of the nail image data to be inserted into the printable area 409 is aligned according to the direction in which the nail shown in the nail area 600 extends. In FIG. 6, the area of one finger is taken as an example for the explanation.

In FIG. 6, the nail app firstly specifies the coordinates of the uppermost part 601, the lowermost part 602, the leftmost part 603, and the rightmost part 604 among the coordinates of the points forming the nail area 600. Here, although the side with the tip of the nail is the upper part and the side with the base of the finger is the lower part in the xy plane of the still image as illustrated in FIG. 6, at least one of the up and down and the left and right can be reversed. It is assumed that the x-axis corresponds to the horizontal direction (direction of the horizontal line) in the still image and the y-axis corresponds to the perpendicular direction (direction of the perpendicular line) in the still image. In the present example, as illustrated in FIG. 6, it is assumed that the horizontal axis corresponds to x (right is the forward direction) and the perpendicular axis corresponds to y (up is the forward direction). In this case, all the points forming the nail area 600 can be represented in the form of coordinates (x, y). In FIG. 6, the point with the largest y-coordinate corresponds to the uppermost part 601, the point with the smallest y-coordinate corresponds to the lowermost part 602, the point with the smallest x-coordinate corresponds to the leftmost part 603, and the point with the largest x-coordinate corresponds to the rightmost part 604.

Next, the nail app generates the rectangle 605 that passes through all the specified coordinates and includes the nail area 600. The rectangle 605 is generated so as to embrace (completely include) the entire nail area 600. This rectangle 605 is different from the printable area 409. The printable area 409 is a rectangular area including a margin for printing, and the rectangle 605 is an area being in contact with the nail area 600 without such a margin. Although the explanation will be given on an assumption that the rectangle 605 and the printable area 409 are different in the present example, it is possible that the rectangle 605 and the printable area 409 result in the same area. Next, the nail app utilizes one of the sides configuring the generated rectangle 605 in order to determine the leaning 606 (rotational angle) of the side relative to a coordinate axis. The nail image data inserted into the printable area 409 is data of an image perpendicular and horizontal to the coordinate axes. Therefore, if the leaning of a side of the rectangle 605 relative to a coordinate axis can be determined, the leaning for inserting nail image data can also be determined. In a case of determining the leaning relative to the y-axis, the nail app uses the left or right side of the rectangle 605 as the side used for determining the leaning 606. In FIG. 6, the case in an example in which the leaning 606 is determined by use of the right side of the rectangle 605 is illustrated. The nail app sets the leaning 606 determined in this way as the inserting direction (rotation direction) in which the nail image data is inserted. Upon determination of the direction in which the nail image data is inserted, the nail app displays the nail image data in the printable area 409 in that direction. That is, a rotation process is performed on the nail image data according to the determined leaning direction, and the rotated nail image data is displayed in the printable area 409 in an overlapping manner. A publicly-known method such as an affine transformation may be used for the rotation process on the nail image data. Although the example of determining the leaning according to the y-axis is explained here, it is also possible to determine the leaning according to the x-axis.

As explained above, in the present embodiment, the process of determining the leaning direction of a nail area is performed by use of the points at the upper-, lower-, left-, and rightmost parts of the detected nail area 600. According to such a process, the leaning direction (or the extending direction) of the nail area 600 can be detected even in a case of a nail that is coated with a base coat. As a result, it is possible to easily and appropriately align the leaning direction of nail image data with the leaning direction of the printable area 409. Therefore, the treatment (printing) will be performed on a nail with an appropriate leaning. In a case where the treatment with nail art is performed on a nail by use of the printer 151, it is common to detect the nail area in a state where a base coat is applied. Therefore, the process according to the present embodiment is useful in many situations. Further, in the present embodiment, it is not necessary for the user to perform an operation on the preview area 407 in order to align the leaning direction of the nail image data with the leaning direction of the printable area 409. Therefore, the usability is also improved. Further, for example, in a case where nail image data is reflected in all four nails, the leanings of the printable areas 409 may all be different. In a case where the process of the present embodiment is not performed, the user needs to perform a rotation operation on the nail image data so that the nail image data is aligned with the leanings of the respective printable areas 409. According to the present embodiment, these operations can be omitted, so that the operability can be improved.

Although the example in which the rectangle 605 including the nail area 600 is uniquely defined is explained with reference to FIG. 6, there may be a case where the rectangle 605 is not uniquely defined, that is, a case where multiple rectangles are generated. In this case, it is possible to select a given one of the generated multiple rectangles 605 so as to thereby determine the leaning of a side of the rectangle. Although there are various methods for selecting the given one, any of the methods may be used. For example, the method of selecting the rectangle whose leaning is the largest among the multiple rectangles 605 may be used, or the method of selecting the rectangle whose leaning is the smallest may be used. Further, it is also possible to determine the median value from the maximum value and the minimum value of the leanings so as to adopt the median value as the leaning. Furthermore, it is also possible to calculate the average value of the leanings from the generated multiple rectangles 605 so as to adopt the calculation result as the leaning. It is also possible to similarly obtain the above-described various effects by aligning the leaning direction of the nail image data with the leaning direction of the nail area 600 (printable area 409) as much as possible.

Figure 7:
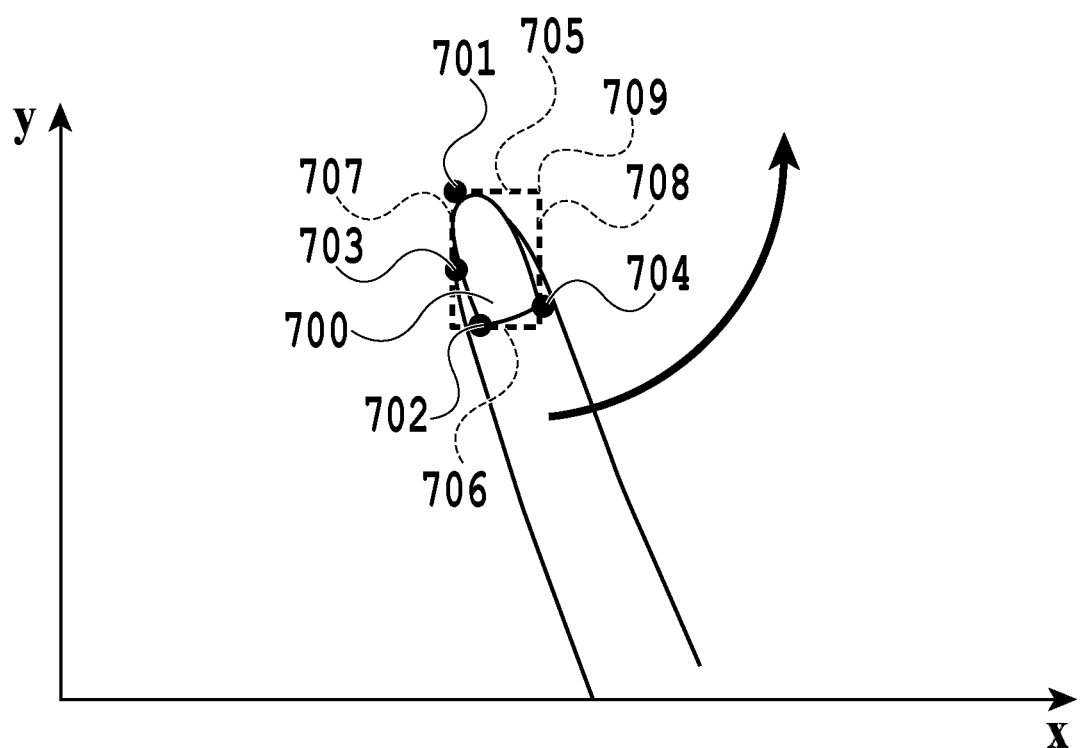
FIG. 7 is a diagram for explaining an example of aligning the direction of the nail image data with the direction of the printable area.

FIG. 7 is a diagram for explaining another example in which the leaning direction of the nail image data is aligned with the leaning direction of the printable area 409. FIG. 7 is a diagram for explaining another example in a case where the rectangle 605 including the nail area 600 cannot be uniquely defined by the method illustrated in FIG. 6. In FIG. 7, the coordinates of the uppermost part 701, the lowermost part 702, the leftmost part 703, and the rightmost part 704 are firstly specified among the coordinates of the points forming the nail area 700. In the example of FIG. 7, it is assumed that a rectangle that passes through all these specified coordinates and includes the nail area cannot be generated. Therefore, next, the nail app generates the straight lines 705 and 706 which pass through the uppermost part 701 and the lowermost part 702, respectively, and are horizontal to the preview area 407. Further, the straight lines 707 and 708 which pass through the leftmost part 703 and the rightmost part 704, respectively, and are perpendicular to the preview area 407. The rectangle 709 formed by these four straight lines 705 to 708 is rotated counterclockwise little by little by the same rotational amount. Here, it is assumed that the straight lines 705 to 708 configuring the rotated rectangle 709 always pass through the coordinates 701 to 704. In this way, the straight lines 705 to 708 are rotated, and, in a case where the rectangle 709 whose four sides correspond to the rotated straight lines does not include the nail area 700 for the first time, the rotation is performed again. The rotation is stopped at the point in time where the rectangle 709 whose four sides correspond to the rotated straight lines includes the nail area 700 for the first time. One of the sides configuring the leaning of the rectangle 709 at this point in time is utilized for determining the leaning of the side relative to a coordinate axis. As for the side used for determining the leaning, the left side 707 or the right side 708 of the rectangle 709 is used in a case of determining the leaning relative to the y-axis. The leaning determined in this way is set as the direction for inserting the nail image data. If the direction for inserting the nail image data is determined, the nail image data is displayed in the printable area 409 in that direction. Although counterclockwise rotation is performed since the finger is leaning to the left in the present example, the rotation direction may be changed according to the direction of leaning.

It is also possible to align the leaning direction of the nail image data with the leaning direction of the printable area 409 as much as possible by the method explained with reference to FIG. 7. Therefore, the various effects explained with reference to FIG. 6 can be similarly obtained.

In the preview area 407 explained with reference to FIG. 4 to FIG. 6, the examples in which an image captured by the image-capturing unit 157 is displayed without being processed is illustrated. Unlike these examples, there is a case in which a processed image of an image captured by the image-capturing unit 157 is displayed in the preview area 407. As a result, there is a case in which the printable area 409 displayed in the preview area 407 is displayed in a direction different from that of the actually-generated print data. The explanation will be given with reference to FIG. 8.

Figure 8:
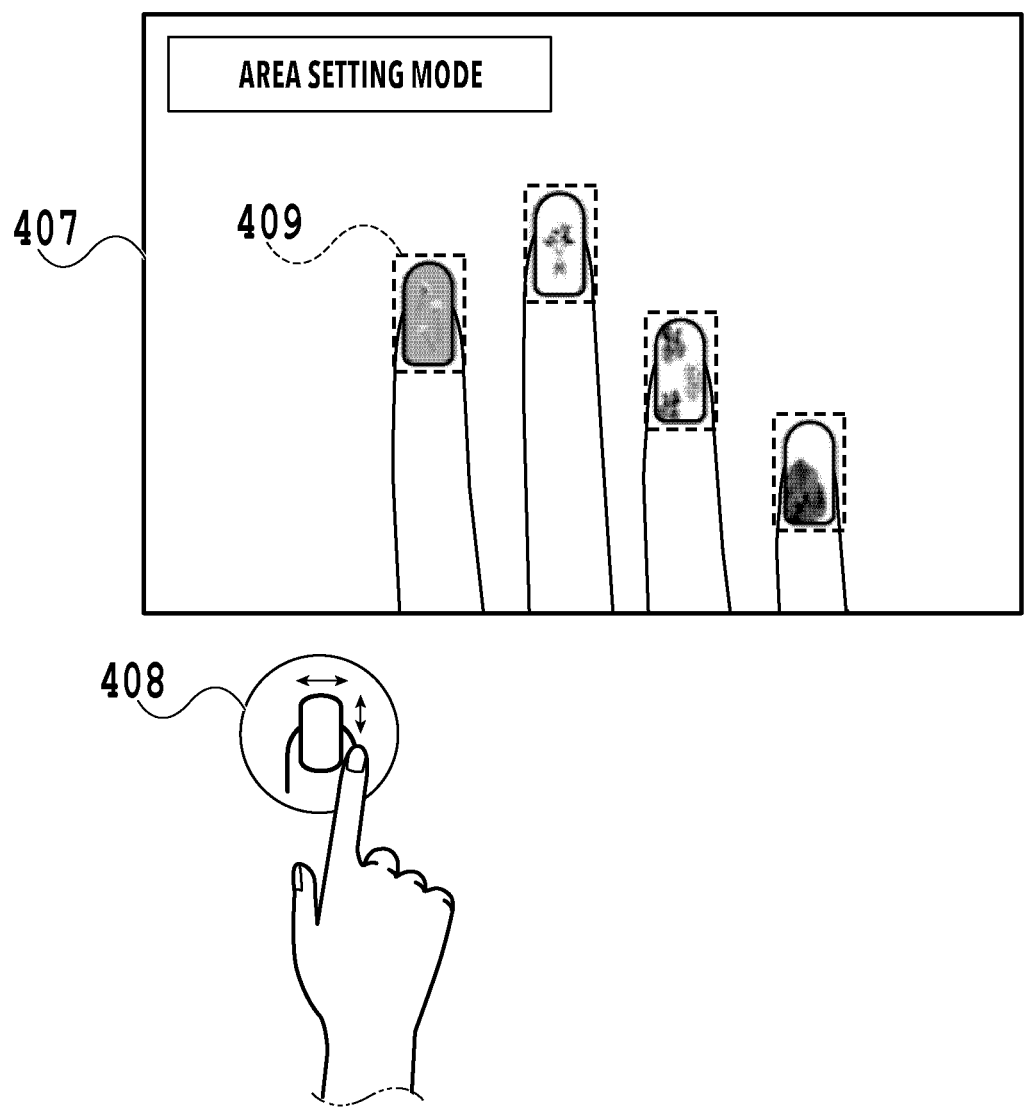
FIG. 8 is a diagram illustrating another display example of a preview area.

FIG. 8 is a diagram illustrating another display example of the preview area 407. In FIG. 8, the example in which an image captured by the image-capturing unit 157 is processed and displayed is illustrated. Specifically, the image captured by the image-capturing unit 157 is cut out for each finger area, and each finger is perpendicularly displayed in the preview area 407. That is, in the example of FIG. 8, the straight lines configuring the printable area 409 are always displayed so as to be horizontal and perpendicular to the preview area 407.

In the case of the preview area 407 illustrated in FIG. 8, there is an advantage that the nail image data can always be checked in a fixed direction, etc. In such a case, it is necessary that the leaning direction of the nail image data reflected in the printable area 409 is aligned with the direction of the printable area corresponding to the actual print data, not with the direction of the printable area 409 displayed in the preview area 407. Therefore, in a case where the preview area 407 illustrated in FIG. 8 is displayed, if nail image data is reflected in the preview area 407, the nail image data is reflected in the direction as it is. On the other hand, since it is necessary to align the print data with the leaning of the actual printable area in a case of generating print data, the leaning of the nail image data is determined by the methods explained with reference to FIG. 6 to FIG. 7. By using the leaning obtained in this way, it is thereby possible to align the leaning direction of the nail image data with the leaning direction of the printable area in the print data. Therefore, even in a case where the printable area 409 displayed in the preview area 407 is in a different direction from that of the actual print data, the nail image data can be reflected in the printable area of the print data in an appropriate direction.

Further, in the present embodiment, in a case where nail image data is inserted according to the direction of the printable area 409, the size of the nail image data can also be changed according to the printable area 409. For example, it is conceivable to reflect (insert) the nail image data after enlarging or reducing the size so that the entire nail image data fits in the printable area 409. Further, it is also possible to enlarge or reduce the size so that a specific part of the nail image data fits in the printable area 409. In this way, not only the direction of the nail image data but also the size of the nail image data can be corrected according to the printable area 409. For reflecting nail image data in the printable area 409 after being enlarged or reduced, in a case where the aspect ratios are different, the part that does not reach the printable area 409 may be filled with predetermined pixels after the nail image data is enlarged or reduced. Alternatively, the image of the part exceeding the printable area 409 may be trimmed off.

The user can freely edit the size of the automatically-set printable area 409. Further, the user can also delete the set printable area 409. The nails to which the user wants to apply nail art may be all the fingernails of the hands or some of the fingernails. Therefore, in the present embodiment, the user can manually edit the automatically-set printable areas 409. Further, the printable area 409, which is the printing target in which an image is reflected, is assumed to be a nail of the user in the present embodiment. Therefore, the sizes of the set printable areas 409 can be different from each other. In the present embodiment, by setting the printable area 409 while the user checks the image of the actual nail after inserting his or her hand into the printer 151, it is thereby possible to print nail art at an appropriate position of the nail. It is also possible that the nail app follows the once-set printable area 409 by use of image recognition processing or the like. For example, if the position of the finger (or nail) shifts in the printer 151 after setting the printable area 409, the nail app may follow the image area of the set printable area 409 so that the printable area 409 is automatically changed.

Returning to FIG. 4, the explanation of the print data generation screen 401 will be continued. The print button 410 on the print data generation screen 401 is a button for providing an instruction for the start of printing. In a case where the print button 410 is pressed, the nail app generates print data for printing on a nail, based on the nail image data reflected in the printable area 409. Then, the nail app sends the generated print data to the printer 151 displayed in the printer name display area 405. In the example illustrated in FIG. 4, the print data is generated by extracting four printable areas 409 from the preview area 407. For generating print data, in a case where the leaning of the nail image data needs to be changed from the leaning displayed in the preview area as in the example explained with reference to FIG. 8, the nail app reflects the change of the leaning to generate the print data. The printer 151 performs printing on the nail, based on the print data that is sent from the nail app.

<Configuration of the Information Processing Apparatus>

Figure 9:
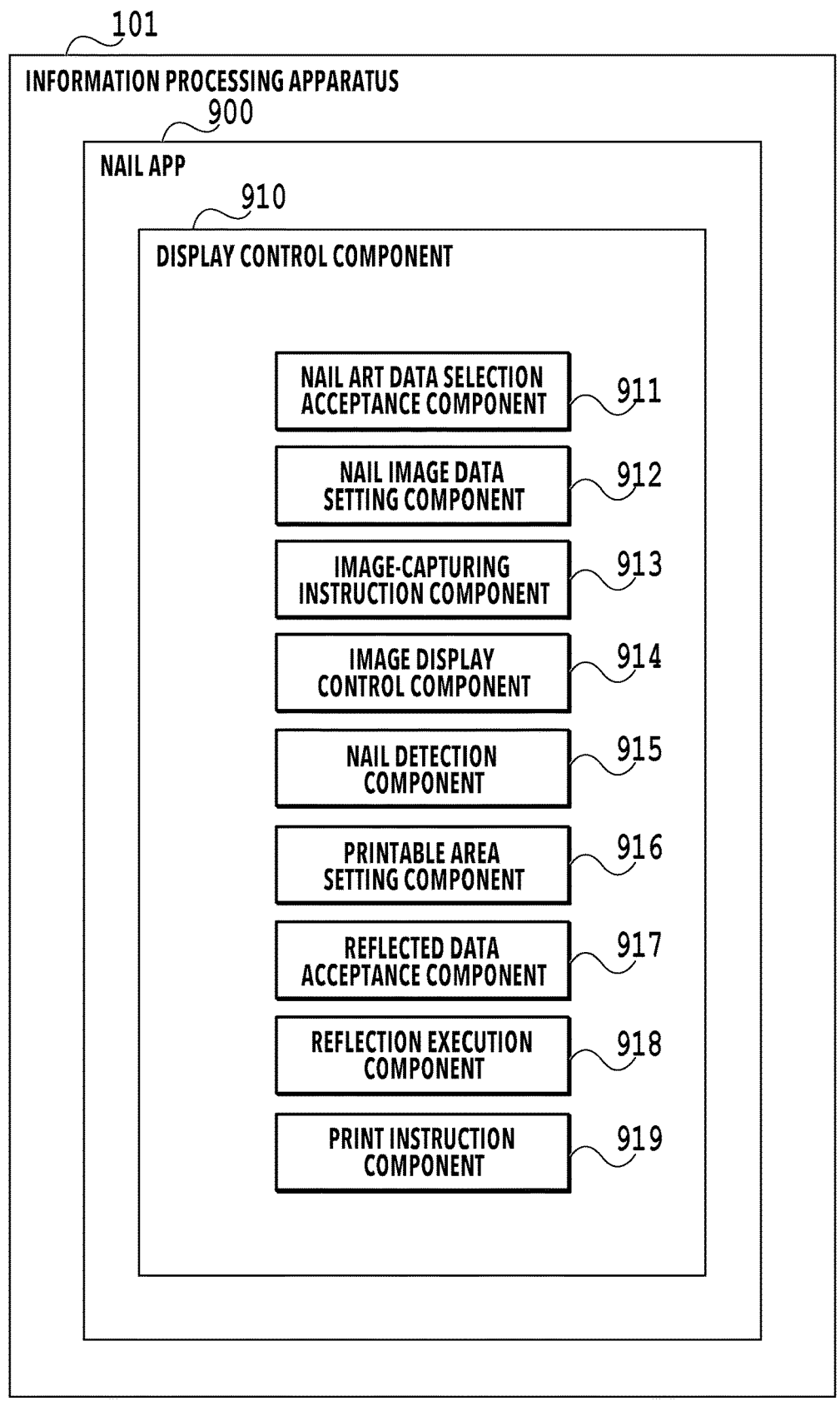
FIG. 9 is a diagram illustrating an example of functional blocks of an information processing apparatus.

FIG. 9 is a diagram illustrating an example of functional blocks of the information processing apparatus 101 for implementing the above-described functions. The information processing apparatus 101 includes the nail app 900. The CPU 103 of the information processing apparatus 101 executes the program of the nail app 900 stored in the ROM 104 or the external storage 106, so that the nail app 900 is thereby capable of causing the CPU 103 to execute the functions of the nail app 900. The nail app 900 includes the display control component 910. The display control component 910 has a function of displaying each UI screen including the nail art data selection screen 201 illustrated in FIG. 2, the nail image data setting screen 301 illustrated in FIG. 3, and the print data generation screen 401 illustrated in FIG. 4 on the display unit 108. Further, the display control component 910 has a function as the input interface 102, so as to perform various kinds of controls according to an operation instruction that is input from the user.

The display control component 910 includes the nail art data selection acceptance component 911, the nail image data setting component 912, the image-capturing instruction component 913, the image display control component 914, and the nail detection component 915. Further, the printable area setting component 916, the reflected data acceptance component 917, the reflection execution component 918, and the print instruction component 919 are included.

As illustrated in FIG. 2, the nail art data selection acceptance component 911 accepts the selection of the nail art data 203 from the user and obtains the selected nail art data 203. As illustrated in FIG. 3, the nail image data setting component 912 obtains the nail image data that is set by the user in the nail setting areas 308 of the left-hand preview area 303 and the right-hand preview area 304. The image-capturing instruction component 913 detects the pressing of the image-capturing button 406 of FIG. 4 or the transition to the print data generation screen 401 in a state where the printer 151 is registered, in order to instruct the printer 151 to capture a moving image. The image display control component 914 displays the image data of the moving image that is sent from the printer 151 in the preview area 407.

The nail detection component 915 performs a nail detection process and outputs the detected nail area 600. The printable area setting component 916 sets the printable area 409 on the preview area 407 by use of a detection result of the nail area 600 by the nail detection component 915. The reflected data acceptance component 917 associates the nail image data selected by the user in the setting data display area 402 with the printable area 409 and accepts the nail image data selected by the user from the setting data display area 402 for the printable area 409. The reflection execution component 918 reflects the nail image data selected by the user from the setting data display area 402 in the corresponding printable area 409. Here, the nail image data is reflected (inserted) in accordance with the leaning direction of the printable area 409. As explained with reference to FIG. 8, in a case where the image in the preview area 407 is an image that is not leaning in the printable area 409, the set nail image data is displayed without leaning in the printable area 409, which is displayed as a preview.

The print instruction component 919 generates print data including the nail image data reflected in the printable area 409 and sends the generated print data to the printer 151. In a case where the nail image data is reflected in a state of leaning according to the direction of the printable area 409, print data including rotated nail image data is generated. As explained with reference to FIG. 8, regarding the nail image data displayed in the preview area 407 and the actual print data, in a case where it is necessary to change the leaning of the nail image data, the print data that is corrected so as to have an appropriate leaning is generated at the time of generating print data.

<Processing Flow>

Figure 10:
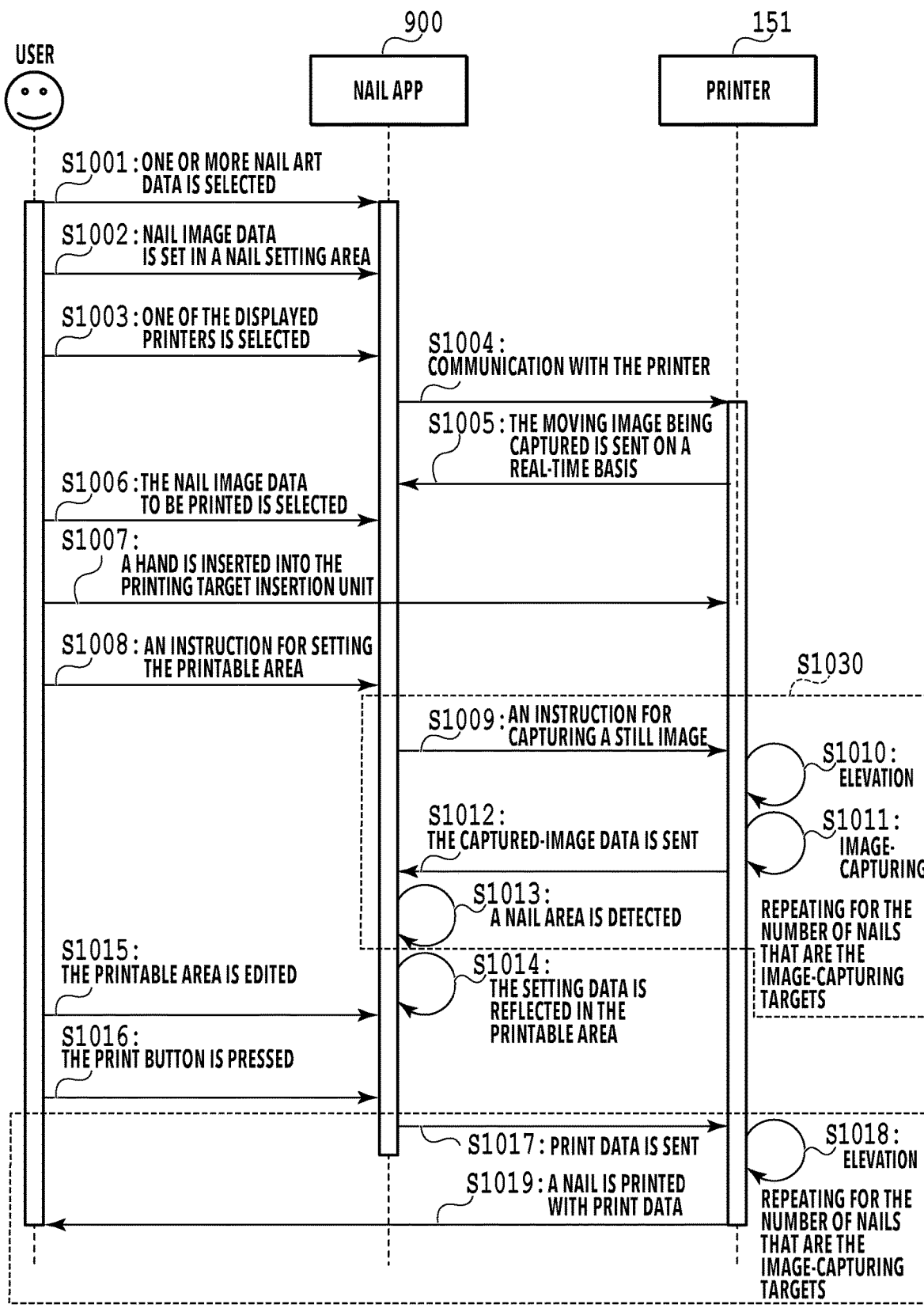
FIG. 10 is a sequence diagram illustrating an example of processing.

FIG. 10 is a sequence diagram illustrating an example of the processing of the present embodiment. The processing of the nail app 900 of FIG. 10 is performed by the CPU 103 of the information processing apparatus 101 loading a program code stored in the ROM 104 or the external storage 106 into the RAM 105 and executing the program code. Alternatively, a part or all of the functions in the steps of FIG. 10 may be implemented by hardware such as an ASIC or an electronic circuit. The symbol "S" in the explanation of each process means that it is a step in the sequence. With reference to FIG. 10, an explanation will be given of a flow in which the user activates the nail app 900 and the print engine 155 prints nail art on a nail inserted into the printing target insertion unit 158 under the control by the nail app 900.

First, the user activates the nail app 900. In S1001, the display control component 910 displays the selection screen 201 illustrated in FIG. 2. The nail art data selection acceptance component 911 accepts selection of one or more nail art data 203 from the nail art data display area 202 of the selection screen 201. If the user presses the nail art data determination button 204 after selecting one or more nail art data 203, the display control component 910 detects the pressing of the button and displays the nail image data setting screen 301 illustrated in FIG. 3 on the display unit 108.

If the nail image data setting screen 301 illustrated in FIG. 3 is displayed on the display unit 108, the nail art data selected by the user is displayed in the nail art data display area 302. In S1002, the nail image data setting component 912 sets the nail image data selected by the user in the nail setting area 308. Accordingly, each nail setting area 308 is associated with the nail image data.

If the user presses the setting completion button 307, the display control component 910 detects the pressing of the button and displays the print data generation screen 401 illustrated in FIG. 4 on the display unit 108.

If the print data generation screen 401 illustrated in FIG. 4 is displayed on the display unit 108, the one or more nail image data that is set by the user in S1002 is displayed in the setting data display area 402 on the print data generation screen 401.

If the printer 151 is not registered, the nail app 900 searches for the printer 151 capable of communicating with the nail app 900. The display control component 910 displays a printer list showing the search results on the display unit 108. If the printer list is displayed on the display unit 108, the user designates the printer 151. In S1003, the display control component 910 selects the printer 151 designated by the user.

In S1004, the image-capturing instruction component 913 communicates with the printer 151 selected in S1004. Then, the nail app 900 instructs the printer 151 to perform image-capturing by use of the image-capturing unit 157. In S1004, it is also possible that the nail app 900 sends a camera activation job to the printer 151. Then, the printer 151 may activates the image-capturing unit 157 to start image-capturing, based on the reception of this camera activation job.

In S1005, the printer 151 sends the moving image being captured by the image-capturing unit 157 to the nail app 900. This moving image is displayed in the preview area 407 of the print data generation screen 401 illustrated in FIG. 4. The moving image captured by the image-capturing unit 157 is displayed in the preview area 407 on an approximately real-time basis. In a case where the user's hand has already been inserted at this point in time, the preview area 407 is in a state of displaying the moving image of the user's fingertips inserted into the printing target insertion unit 158.

The user selects one nail image data (setting data) to be printed on a nail from the setting data display area 402. In S1006, the reflected data acceptance component 917 accepts the selection of one nail image data from the user. The display control component 910 displays the nail image data selected by the user in a highlighted manner.

In S1007, the user inserts the user's hand into the printing target insertion unit 158 installed in the printer 151 for printing. Here, in order to print the nail image data more vividly, a gel-like liquid (base coat) is applied to the user's nails in advance. There are multiple colors of this base coat, such as white and translucent. Further, it is also possible that, after S1006, the nail app 900 displays a message prompting the user to insert a hand into the printer 151.

In a state where the moving image is displayed in the preview area 407 in S1005 and the selection of the nail image data is accepted in S1006, the user presses the printable area setting button 408. The acceptance of the instruction for setting the printable area 409 is triggered by the pressing of the printable area setting button 408, so that the nail app 900 performs the printable area setting process of S1030. In the printable area setting process of S1030, the nail area 600 in the preview area 407 is automatically detected by the nail detection component 915, and the printable area 409 is set based on the detected nail area 600. In the explanation of the present flowchart, it is assumed that the number of printable areas 409 that can be set is defined in advance as a predetermined value. Since the present embodiment attends to the number of nails of the index finger, middle finger, ring finger, and little finger of one hand, the predetermined value is defined as "4". This predetermined value corresponds to the number of rails mounted on the printing target insertion unit 158 and the number of nail image data included in the setting data. In the present embodiment, the mode in which the user sets the same number of printable areas 409 as this predetermined value will be taken as an example for the explanation. That is, in the present embodiment, it is assumed that four printable areas 409 are set.

In S1009, the image-capturing instruction component 913 sends an instruction for capturing a still image to the printer 151. The image-capturing instruction is sent with the rail number corresponding to the nail to be the image-capturing target. For example, in a case where the four rails are numbered 1 to 4 from the left, "1" is sent for capturing the little finger of the left hand and "4" is sent for capturing the index finger of the left hand, and "1" is sent for capturing the index finger of the right hand and "4" is sent for capturing the little finger of the right hand. It is also possible that the image-capturing instruction component 913 cuts out and uses a frame of the moving image, instead of sending the instruction for capturing a still image.

In S1010, the printer 151 elevates all the rails and adjusts the nails to a height close to the print head of the printer 151. By arranging the nails at a height close to the print head, the ink ejected from the print head can be surely landed on the nails in a case of an ink jet printer. A movable laser sensor mounted on the printer 151 is used for the height adjustment. The laser sensor is installed at a height close to the printhead and the rails are controlled so as to elevate the nail height to the height as high as possible where the laser is not blocked. In the adjustment of the nail height, it is possible to adjust the height more efficiently by grasping the approximate position of a nail and then narrowing the operation range of the laser sensor to the range of the nail, rather than setting the movable range for the entire finger. Therefore, it is preferable to detect the nail in advance before adjusting the nail height and then send the position information of the nail from the nail app 900 to the printer 151 together with the image-capturing instruction of S1009. In the present embodiment, such nail detection in advance will be referred to as prior nail detection. In a case of performing the prior nail detection, an image-capturing instruction is sent from the nail app 900 to the printer 151 before S1009. Since the nail height is not adjusted in the prior nail detection, the above-described rail number need not be included in the image-capturing instruction to be sent. Upon receiving the image-capturing instruction, the printer 151 captures a still image with the image-capturing unit 157. Upon completing the image-capturing, the printer 151 sends the captured image to the nail app 900. The nail app 900 detects the nails in the received captured image, retains the nail position information of all the detected nails, and sends the position information of the nail that is the image-capturing target to the printer 151 together with the rail number in a case of providing the image-capturing instruction in S1009. The printer 151 adjusts the nail height by narrowing the movable range of the laser sensor, based on the received nail position information.

After the nail height adjustment is completed, the image-capturing unit 157 captures a still image in S1011. Upon ending the image-capturing, the height of the rail is returned to the initial value, and the printer 151 sends the captured-image data to the nail app 900 in S1012.

In S1013, the nail app 900 detects the nail area from the received captured image. The printable area 409 is determined based on the nail area 600 detected here. As one method of detecting the nail area, there is a method of detecting the white color of the base coat applied to the nail by image processing. Specifically, pixels exceeding a predetermined threshold value (for example, R>200, G>200, B>200) are detected from the RGB values of the captured image, and the detected area is determined as the nail area.

In order not to erroneously detect the rail beneath a finger as a nail in the nail detection, it is preferable that the color of the rail is black or the like other than white. Further, it is desirable that the rail is configured of a material that diffusely reflects light, so that a white area part in the captured image caused by the reflection of light is not erroneously detected. Further, since the detection by image processing is difficult in a case where the base coat is translucent, it is also possible to use machine learning as another detection method. By using an image of a nail coated with a white or translucent base coat as an image to be a learning target in the machine learning, it is possible to detect a nail area even in a case of a translucent base coat, not only a white base coat. In the machine learning, a learning model is established by learning where in a prepared learning image a nail is located. The established learning model is incorporated in the nail app 900, processed by the CPU 103 or the GPU 110, and utilized to detect a nail area from a captured image. Since the color of the skin and the shape of a nail vary depending on the person, it is preferable that many hand patterns are prepared as the learning images for learning. There are many frameworks for machine learning, and machine learning can be implemented by utilizing existing frameworks.

The steps S1009 to S1013 are repeated for the number of nails that are the image-capturing targets. For example, in a case where the four nails from the little finger to index finger of a left hand are targeted, image-capturing and nail detection are repeated for each finger. There will be a total of four captured images. In a case where the printable area setting component 916 sets the printable area 409, a part in which the target nail is captured is cut out from each captured image and displayed in the preview area 407. That is, four cut-out nail images are displayed in an order in the preview area 407, and the printable area 409 is set for each nail image. It is also possible that the cut-out nail images are displayed with leanings as illustrated in FIG. 5 or are displayed with the leanings being corrected as illustrated in FIG. 8. Further, although the example of capturing the respective nail images is explained here, it is also possible that the nail areas are detected from one captured image.

After the printable area 409 is set by the printable area setting component 916, the reflected data acceptance component 917 accepts the four types of nail image data which are set in the setting data as the reflected data to be reflected in the printable area 409 in S1014. Then, the reflected data acceptance component 917 associates the four types of nail image data which are set in the setting data with the four printable areas 409 that are set. Then, the reflection execution component 918 reflects the setting data in the printable area 409, based on this association. In this S1014, the nail image data is reflected in accordance with the leaning direction of the printable area 409. The processing flow for aligning the directions of the printable area 409 and the nail image data will be described later with reference to FIG. 11. For reflecting the nail image data in the printable area 409, the nail image data is reflected in accordance with the size of the printable area 409.

In S1015, the user edits the printable area 409 as needed. For example, in a case where the user wants to adjust the size, etc., of the printable area 409, the printable area 409 can be edited. In this case, the reflected data acceptance component 917 accepts the edition, and the result of the edition is reflected by the reflection execution component 918.

Next, the user presses the print button 410 after checking the reflected state of the setting data in the printable area 409. In response to this, in S1016, the print instruction component 919 generates print data in which the setting data (nail image data) is reflected in the printable area 409. Here, it is also possible that the nail app 900 displays a message indicating "please do not move the hand inserted in the printer 151". Further, in a case where the leaning direction of the printable area 409 displayed in the preview area 407 is different from the leaning direction of the printable area in the actual print data, the nail image data is reflected in accordance with the direction of the printable area in the print data. The processing flow in this case is the same as the later-described processing of FIG. 11.

In S1017, the nail app 900 sends the generated print data to the printer 151. In S1018, the printer 151 elevates the rails to the same height as in S1010. Accordingly, the positions of the nails are reset to the positions suitable for printing. In S1019, the printer 151 performs printing based on the sent print data. As a result, an image of a nail is printed on the user's nail. The steps S1017 to S1019 are repeated for the number of nails that are the printing targets. For example, in a case where the four nails from the little finger to index finger of a left hand are targeted, print data is repeatedly sent and printed for each finger.

It is also possible that the printer 151 continues the image-capturing of the nails during printing, so that the printing is stopped in a case where it is detected that the hand has drawn away from the printer 151 before the printing is completed. Further, it is also possible that the nail app 900 detects that the hand has drawn away from the printer 151 before the printing is completed and the nail app 900 instructs the printer 151 to stop printing.

Figure 11:
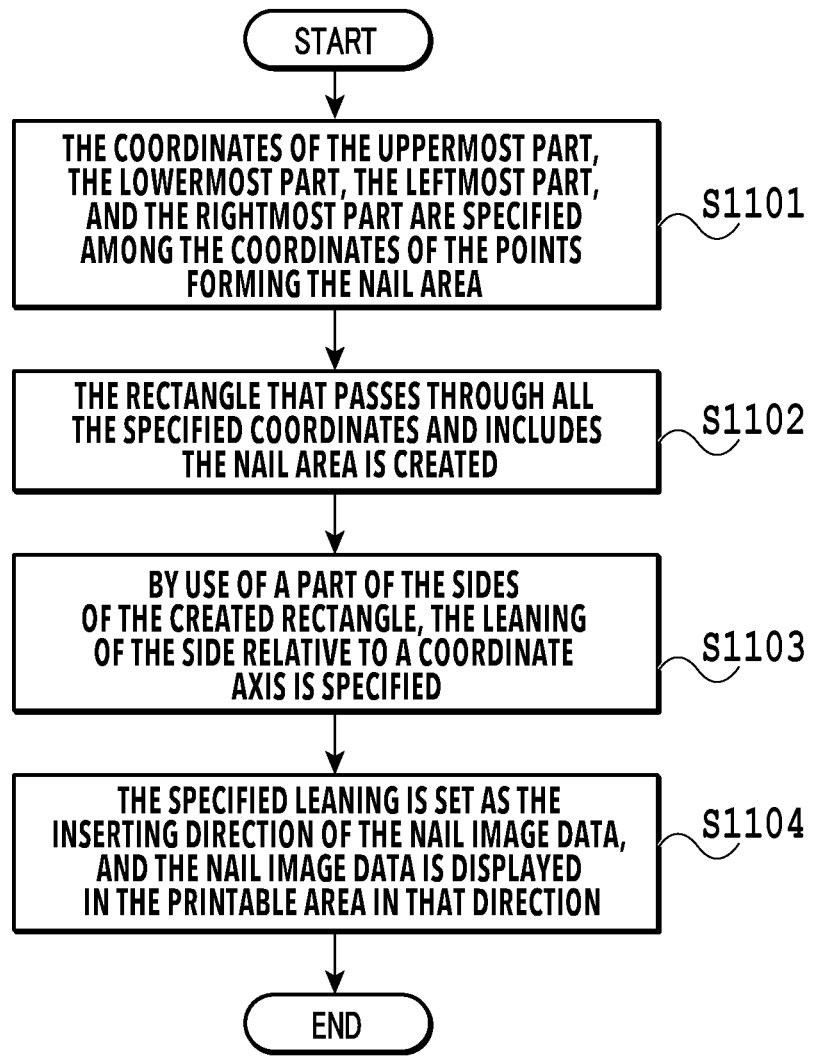
FIG. 11 is a flowchart illustrating a process of setting the printable area based on a nail area.

FIG. 11 is a flowchart illustrating the process of setting the printable area 409 based on the nail area 600, which is performed in S1014. That is, an explanation will be given of the example in which, in a case where an object (nail image) is inserted into a predetermined area (nail area) included in a captured image, the leaning for inserting the object will be appropriately determined.

In S1101, the nail app 900 specifies the coordinates of the uppermost part 601, the lowermost part 602, the leftmost part 603, and the rightmost part 604 among the coordinates of the points forming the nail area 600. Next, in S1102, the nail app 900 generates the rectangle 605 that passes through all the specified coordinates and includes the nail area 600. Subsequently, in S1103, by use of a part of the sides of the generated rectangle 605, the nail app 900 specifies the leaning of the side relative to a coordinate axis. This leaning is the direction in which the nail image data is inserted. Upon determination of the direction for inserting the nail image data in S1103, the nail app 900 displays the nail image data in the printable area 409 in that direction in S1104. With this processing flow, it is possible to perform printing on a nail with the direction of the nail image data being aligned with the direction of the printable area 409. Since the process of aligning the direction of the nail image data with the direction of the printable area 409 by a user operation can be skipped, the usability can be improved. As described above, it is also possible that the processing of FIG. 11 is performed in generation of print data. In this case, "the nail image data is displayed" in S1104 may be read as "the nail image data is reflected".

Figure 12:
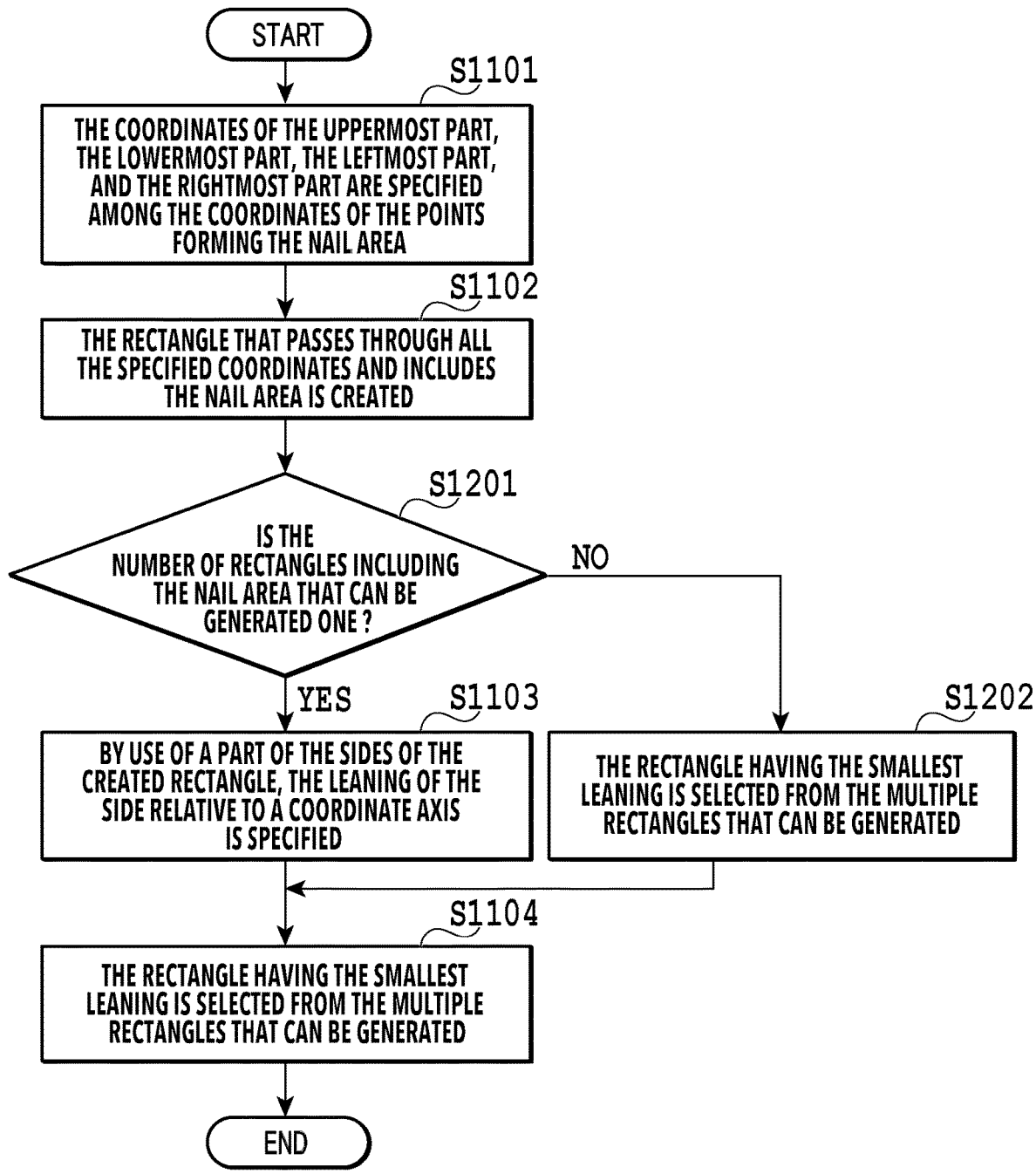
FIG. 12 is a flowchart illustrating a process of setting the printable area based on a nail area.

FIG. 12 is a flowchart illustrating another processing of setting the printable area 409 based on a nail area. FIG. 12 is a processing flow including a case where the direction of the printable area 409 is not uniquely defined. FIG. 12 is the processing executed instead of the processing of FIG. 11. The same reference numerals are given to the same processes as those in FIG. 11.

The processes of S1101 and S1102 are the same as those in the example explained with reference to FIG. 11. In S1201, the nail app 900 confirms whether the number of rectangles 605 including the nail area 600 that can be generated is one. In a case where the number of rectangles 605 that can be generated is one, the processing proceeds to S1103. The process of S1103 is the same as that in the example explained with reference to FIG. 11. Then, thereafter, the processing proceeds to S1104. The process of S1104 is also the same as that in the example explained with reference to FIG. 11.

On the other hand, in S1201, in a case where the number of rectangles 605 including the nail area 600 is not one, that is, in a case where there are two or more rectangles 605, the processing proceeds to S1202. In S1202, the nail app 900 selects the rectangle 605 having the smallest leaning from the multiple rectangles 605 that can be generated. The nail app 900 specifies the leaning of the selected rectangle 605 as the leaning to be used in S1104 and proceeds the processing to S1104.

Although the example in which the nail app 900 selects the rectangle 605 having the smallest leaning in S1202 is illustrated in the processing of FIG. 12, the reference for the selection is not limited as such. For example, it is also possible to select the rectangle 605 having the largest leaning or the rectangle 605 with having leaning of the median value. Any method may be used as long as one rectangle 605 can be selected. By such a processing flow, even in a case where there are multiple rectangles 605 including the nail area 600, the nail image data can be inserted (reflected) into the printable area 409 in a state where the direction of the nail image data is aligned with the direction of the printable area 409.

As explained above, according to the present embodiment, it is possible to appropriately determine the leaning for inserting an object. Therefore, for example, even in a state where streaks of a nail cannot be detected, it is possible to detect the leaning direction of the nail and print the nail art in a state of being aligned with the leaning direction of the nail. That is, even with a nail that is coated with a base coat, the leaning direction of the printable area can be detected, and the nail image data can be inserted with the leaning direction thereof being aligned with that of the printable area 409. Accordingly, it is possible to reduce the need for the user to align the leaning direction of the nail image data with the leaning direction of the printable area, so that the usability can be improved.

Second Embodiment

In the first embodiment, the explanation has been given of the example in which the inserting direction of nail image data is determined by use of a detected leaning direction of a nail area. In the present embodiment, an explanation will be given of the example in which the leaning direction of a finger is utilized, instead of a nail area, for determining the inserting direction of nail image data. That is, an explanation will be given of the example in which the direction for inserting nail image data is not aligned with a nail, which is the first object, but with the leaning direction of a finger, which is the second object movable together with the nail that is the first object. The present embodiment can be effective even in a case where a nail area cannot be detected in the operation of the nail detection component 915 (process of S1013) in response to the operation on the printable area setting button 408. The processing according to the present embodiment can also exert an effect on a nail to which a base coat is applied.

Also in the present embodiment, as in the first embodiment, in response to the pressing of the printable area setting button 408 of FIG. 5, the nail app 900 transitions to the area setting mode in which the printable area 409 can be set. In the first embodiment, the example of detecting a nail area based on a captured still image so as to set the printable area 409 has been explained. In the present embodiment, the nail app operates so as to detect a finger contour in a case where a nail area cannot be detected.

Figure 13:
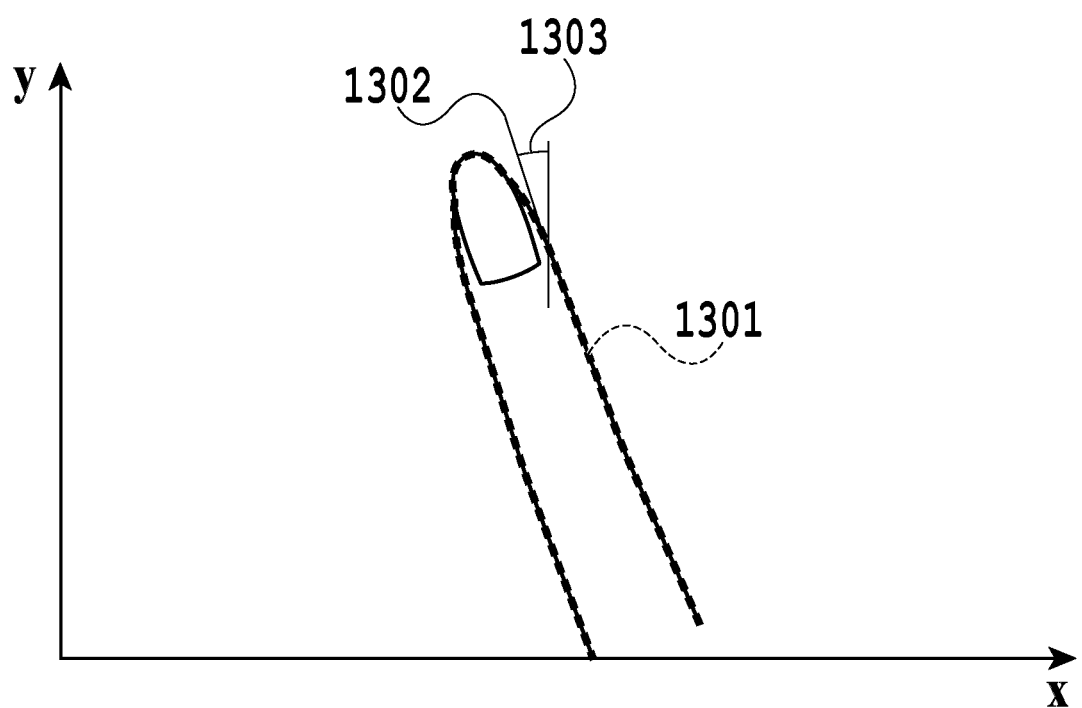
FIG. 13 is a diagram for explaining an example of determining the inserting direction of an object.

FIG. 13 is a diagram for explaining the example of determining the inserting direction of an object in the present embodiment. In a case where the nail app 900 cannot detect a nail area from a still image and cannot set the printable area 409, the nail app 900 detects a finger contour from the still image. As an example of the method of detecting a finger contour, a learning model generated by machine learning can be used. The learning model used for detecting a finger contour is a learning model that outputs a finger contour if a still image including a finger is input. It is not always necessary to use machine learning for implementing the detection of a finger contour, and the implementation may be performed by image processing using the difference between the color indicating a finger and the background color which is the base thereof. In particular, in the case of detecting a finger contour, by fixing the base color on which the finger is placed to a specific color, the color difference becomes clear, and the finger contour can be detected with a lower cost than using machine learning.

As illustrated in FIG. 13, the respective fingers inserted into the printer 151 are generally leaning in different directions, so it is required that the nail image data is reflected in accordance with the direction of each finger. After detecting the finger contour 1301, the nail app 900 draws the approximate straight line 1302 by use of the detected finger contour 1301. For example, the least squares method can be used for calculating the approximate straight line 1302. The least squares method is a method in which, in a situation where the number of given data sets (x, y) is n, the most suitable straight line for n "x"s and "y"s will be drawn. This straight line is represented by the leaning $A = Cov(X, Y)/\sigma x^2$ and the intercept $B = \mu_Y - A\mu_X$. Here, it is indicated that $\mu_X$ is the average of n "X"s, $\sigma_X$ is the standard deviation of n "X"s, $\mu_Y$ is the average of n "Y"s, and Cov (X, Y) is the covariance.

Here, it is not necessary to use the entire finger contour 1301, and it is also possible to use a part of the coordinates of the respective points configuring the finger contour 1301. In particular, in a case of calculating the approximate straight line 1302 with the upper part of the finger contour 1301, there is a possibility that the difference from the actual direction of the finger becomes large. Therefore, it is possible to improve the accuracy by calculating the approximate straight line 1302 with coordinates excluding the upper part out of the coordinates of the respective points configuring the finger contour 1301. Further, it is also possible to draw the approximate straight line 1302 by use of either the left side or the right side of the finger out of the respective points configuring the finger contour 1301. Further, it is also possible to calculate the respective center points from the points respectively configuring the finger contour 1301 divided into the left side and the right side, so as to draw the approximate straight line 1302 by use of the center points. Specifically, n sets of two points $(x, y_1)$ and $(x, y_2)$ are generated, and n center points $(x, (y_1+y_2)/2)$ are calculated from the straight lines connecting the two points $(x, y_1)$ and $(x, y_2)$, so as to draw the approximate straight line 1302 by use of these n center points. The leaning 1303 of the approximate straight line 1302 that can be drawn in this way can be set as the leaning of the finger. The direction for inserting the nail image data is determined from the leaning of the finger. If the direction for inserting the nail image data is determined, the nail image data is displayed in the printable area 409 in that direction. The above is merely an example, and it is also possible to use other methods. For example, it is possible to extract given coordinates to be used for drawing the approximate straight line 1302, such as by using the part above the first joint of the finger.

As described above, according to the present embodiment, the direction for inserting nail image data can be determined from the leaning of a finger. As a result, the nail image data can be inserted with the direction of the nail image data being aligned with the direction of the printable area 409 as much as possible. Further, the usability can be improved by the present embodiment as well. Further, even in a case of a nail that is coated with a base coat, the nail image data can be applied to the printable area 409 in the appropriate direction as much as possible. Although the example of detecting a finger contour in a case where a nail area cannot be detected has been explained in the present embodiment, it is also possible to detect a finger contour and determine the direction for inserting the nail image data from the detected finger contour, regardless of detection of a nail area.

Third Embodiment

In the present embodiment, an explanation will be given of the example of using AI (learning model generated by machine learning) as a method of determining the inserting direction of nail image data. The learning model used here is a learning model that outputs a result of detecting the direction of a nail if a still image including a nail is input. In the third embodiment, the inserting direction of nail image data is determined by use of the present learning model in the process by the operation of the nail detection component 915 (S1012), which is performed in response to an operation on the printable area setting button 408 of the first embodiment. The method according to the present embodiment can also exert an effect on a nail to which a base coat is applied.

A learning model for implementing such a function can be configured by deep learning. The learning is performed by using a still image including a nail to which a base coat is applied and the leaning of the nail which is the correct information for the still image as teacher data, so that a learning model is obtained by accumulating the teacher data. By using a learning model configured in this way, if a still image of a processing target including a nail is given as an input, the direction of the nail included in the still image of the processing target is output. By setting the direction of the nail that is thus obtained as the direction in which the nail image data is reflected, the direction of the nail image data can be aligned with the direction of the printable area 409.

As described above, also in the present embodiment, the nail image data can be inserted with the direction of the nail image data being aligned with the direction of the printable area 409 as much as possible. Further, the usability can be improved by the present embodiment as well. Further, even in a case of a nail that is coated with a base coat, the nail image data can be applied to the printable area 409 in the appropriate direction as much as possible.

OTHER EMBODIMENTS

Although the printer 151 of a mode in which one hand is inserted into the printing target insertion unit 158 has been taken as an example for the explanations in the first to third embodiments, there is not such a limitation. For example, such a printer installed in a store or the like into which both hands are inserted may be used. In this case, the operations may be performed by a clerk or the like.

Further, although each explanation of the above-described embodiments has been given with the example of printing an image (pattern) as nail art, such a mode in which image data and shape data representing a three-dimensional structure are used for forming a structure including a pattern as nail art.

Further, although the mode in which a hand is inserted into the printer 151 and the printing is directly performed on a nail has been explained in each of the above-described embodiments, there may be other modes. For example, it is also possible to apply the processing of each of the above-described embodiments in a case where the printing is performed by use of a printer that performs printing on such an object as a sticker to be attached to a nail.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-130532, filed Jul. 31, 2020, which is hereby incorporated by reference herein in its entirety.

What is claimed is:

1. An information processing apparatus that determines a leaning of an object image in a case of inserting the object image into a nail area included in a captured image, the information processing apparatus comprising:
- a detection unit configured to detect a single nail area from the captured image in which a nail having a leaning is captured;
- a generation unit configured to obtain respective coordinates of an uppermost part, a lowermost part, a leftmost part, and a rightmost part of the single nail area detected by the detection unit, and to generate a rectangle that passes through all of the obtained coordinates and that includes the single nail area; and
- a determination unit configured to:
  - (1) in a first case where only one rectangle that passes through all of the obtained coordinates is generated for the single nail area by the generation unit, determine a leaning of the rectangle relative to a horizontal line or perpendicular line of the captured image as the leaning to be used for inserting the object image, and
  - (2) in a second case where a plurality of rectangles that pass through all of the obtained coordinates are generated for the single nail area by the generation unit, determine the leaning to be used for inserting the object image by use of a leaning of any one of the plurality of rectangles based on a selection reference,
- wherein (a) the selection reference selects a rectangle whose leaning is largest among the plurality of rectangles, or (b) the selection reference selects a rectangle whose leaning is smallest among the plurality of rectangles, or (c) the selection reference selects a rectangle in accordance with a median leaning of leanings of the plurality of rectangles, or (d) the selection reference selects a rectangle in accordance with an average leaning of leanings of the plurality of rectangles.

2. The information processing apparatus according to claim 1, further comprising an insertion unit configured to rotate the object image according to the leaning determined by the determination unit and to insert the rotated object image into the nail area.

3. The information processing apparatus according to claim 2, wherein the insertion unit is configured to enlarge or reduce the object image and to insert the object image into the nail area.

4. The information processing apparatus according to claim 2, further comprising an output unit configure to output print data to a printing device by use of data inserted by the insertion unit.

5. The information processing apparatus according to claim 1, wherein the object image corresponds to an image to be printed in the nail area.

6. The information processing apparatus according to claim 5, wherein the detection unit is configured to detect a group of pixels of a predetermined color as the nail area.

7. The information processing apparatus according to claim 5, wherein the detection unit is configured to determine the nail area, based on an output that is obtained by inputting the captured image to a learning model.

8. The information processing apparatus according to claim 1, wherein in a third case where the rectangle that passes through all of the obtained coordinates cannot be generated for the single nail area, the generation unit is configured to (1) determine horizontal straight lines from the coordinates of the uppermost part and the coordinates of the lowermost part, respectively, (2) determine perpendicular straight lines from the coordinates of the leftmost part and the coordinates of the rightmost part, respectively, and (3) rotate the respective straight lines by the same angle, and wherein, in a case where the nail area is included in a rectangle whose four sides correspond to the rotated straight lines, the determination unit is configured to determine a leaning corresponding to the rotated straight lines as the leaning to be used for inserting the object image.

9. A non-transitory computer-readable storage medium storing a program which causes a computer that determines a leaning of an object image in a case of inserting the object image into a nail area included in a captured image to function as a plurality of units comprising:
- a detection unit configured to detect a single nail area from the captured image in which a nail having a leaning is captured;
- a generation unit configured to obtain respective coordinates of an uppermost part, a lowermost part, a leftmost part, and a rightmost part of the single nail area detected by the detection unit and to generate a rectangle that passes through all of the obtained coordinates and that includes the single nail area; and
- a determination unit configured to:
  - (1) in a first case where only one rectangle that passes through all of the obtained coordinates is generated for the single nail area by the generation unit, determine a leaning of the rectangle relative to a horizontal line or perpendicular line of the captured image as the leaning to be used for inserting the object image, and
  - (2) in a second case where a plurality of rectangles that pass through all of the obtained coordinates are generated for the single nail area by the generation unit, determine the leaning to be used for inserting the object image by use of a leaning of any one of the plurality of rectangles based on a selection reference,
- wherein (a) the selection reference selects a rectangle whose leaning is largest among the plurality of rectangles, or (b) the selection reference selects a rectangle whose leaning is smallest among the plurality of rectangles, or (c) the selection reference selects a rectangle in accordance with a median leaning of leanings of the plurality of rectangles, or (d) the selection reference selects a rectangle in accordance with an average leaning of leanings of the plurality of rectangles.

10. The storage medium according to claim 9, wherein in a third case where the rectangle that passes through all of the obtained coordinates cannot be generated for the single nail area, the generation unit is configured to (1) determine horizontal straight lines from the coordinates of the uppermost part and the coordinates of the lowermost part, respectively, (2) determine perpendicular straight lines from the coordinates of the leftmost part and the coordinates of the rightmost part, respectively, and (3) rotate the respective straight lines by the same angle, and wherein, in a case where the nail area is included in a rectangle whose four sides correspond to the rotated straight lines, the determination unit is configured to determine a leaning corresponding to the rotated straight lines as the leaning to be used for inserting the object image.

11. The storage medium according to claim 9, wherein the program causes the computer further to function as an inserting unit configured to rotate the object image according to the leaning determined by the determination unit and to insert the rotated object image into the nail area.

12. The storage medium according to claim 9, wherein the object image corresponds to an image to be printed in the nail area.

13. The storage medium according to claim 12, wherein the detection unit determines the nail area based on an output that is obtained by inputting the captured image to a learning model.

* * * * *